United States Patent
Hatambeiki et al.

(10) Patent No.: US 12,008,223 B2
(45) Date of Patent: *Jun. 11, 2024

(54) SYSTEM AND METHOD FOR FLEXIBLE CONFIGURATION OF A CONTROLLING DEVICE

(71) Applicant: Universal Electronics Inc., Scottsdale, AZ (US)

(72) Inventors: Arsham Hatambeiki, Irvine, CA (US); Christopher A. Chambers, Westminster, CA (US); Han-Sheng Yuh, Diamond Bar, CA (US); Steven Clegg, Rancho Santa Margarita, CA (US)

(73) Assignee: Universal Electronics Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/197,334

(22) Filed: May 15, 2023

(65) Prior Publication Data

US 2023/0280888 A1 Sep. 7, 2023

Related U.S. Application Data

(60) Continuation of application No. 17/686,710, filed on Mar. 4, 2022, now Pat. No. 11,687,217, which is a
(Continued)

(51) Int. Cl.
*G06F 3/0484* (2022.01)
*G06F 3/01* (2006.01)
(Continued)

(52) U.S. Cl.
CPC ........... *G06F 3/0484* (2013.01); *G08C 17/02* (2013.01); *G08C 23/04* (2013.01); *G11B 27/034* (2013.01);
(Continued)

(58) Field of Classification Search
CPC ........ G06F 3/01; G06F 3/0484; G06F 3/0486; G06F 1/16; G06F 8/10; G06F 9/06;
(Continued)

(56) References Cited

U.S. PATENT DOCUMENTS 5,410,326 A   4/1995  Goldstein
5,555,369 A   9/1996  Menendez et al.
(Continued)

FOREIGN PATENT DOCUMENTS

WO   0017738        3/2000
WO   0039772        7/2000
WO   2005/055165 A1 6/2005

OTHER PUBLICATIONS

Leeb et al. A Configuration Tool for HomeNet. Aug. 1996. IEEE Transactions on Consumer Electronics, vol. 42, No. 3. pp. 387-394. (Year: 1996).*

(Continued)

*Primary Examiner* — Jennifer N Welch
*Assistant Examiner* — Ashley M Fortino
(74) *Attorney, Agent, or Firm* — Greenberg Traurig, LLP

(57) ABSTRACT

A system and method whereby an user interface editing device is used to create a user interface for a controlling device, the created user interface including user interface elements that are associated with functional operations of a virtual equivalent of an appliance. After the created user interface is transferred to the controlling device, the virtual equivalent of an appliance is caused to be linked to an intended target appliance whereupon activation of those user interface elements of the graphical user interface that were associated with functional operations of the virtual equivalent of an appliance will cause the controlling device to transmit commands to control corresponding functional operations of the intended target appliance.

12 Claims, 18 Drawing Sheets

Related U.S. Application Data continuation of application No. 17/410,054, filed on Aug. 24, 2021, now Pat. No. 11,656,743, which is a continuation of application No. 16/596,622, filed on Oct. 8, 2019, now Pat. No. 11,119,637, which is a continuation of application No. 15/632,775, filed on Jun. 26, 2017, now Pat. No. 10,509,548, which is a continuation of application No. 13/673,271, filed on Nov. 9, 2012, now Pat. No. 9,720,575, which is a division of application No. 12/629,423, filed on Dec. 2, 2009, now Pat. No. 9,632,665, which is a continuation-in-part of application No. 11/357,681, filed on Feb. 16, 2006, now Pat. No. 7,941,786, which is a continuation-in-part of application No. 11/218,900, filed on Sep. 2, 2005, now Pat. No. 7,266,777.

(60) Provisional application No. 61/201,021, filed on Dec. 5, 2008, provisional application No. 60/705,926, filed on Aug. 5, 2005, provisional application No. 60/608,183, filed on Sep. 8, 2004.

(51) Int. Cl.
| | |
|---|---|
| *G06F 3/0486* | (2013.01) |
| *G06F 8/10* | (2018.01) |
| *G06F 9/06* | (2006.01) |
| *G08C 17/02* | (2006.01) |
| *G08C 23/04* | (2006.01) |
| *G11B 27/034* | (2006.01) |
| *G11B 27/34* | (2006.01) |
| *H04N 21/422* | (2011.01) |
| *H04N 21/81* | (2011.01) |
| *G06F 1/16* | (2006.01) |

(52) U.S. Cl.
CPC ....... *G11B 27/34* (2013.01); *H04N 21/42204* (2013.01); *H04N 21/42208* (2013.01); *H04N 21/42224* (2013.01); *H04N 21/42228* (2013.01); *H04N 21/8186* (2013.01); *G06F 1/16* (2013.01); *G06F 3/01* (2013.01); *G06F 3/0486* (2013.01); *G06F 8/10* (2013.01); *G06F 9/06* (2013.01); *G08C 2201/20* (2013.01); *G08C 2201/21* (2013.01); *G08C 2201/30* (2013.01); *G08C 2201/92* (2013.01)

(58) Field of Classification Search
CPC .... G08C 17/02; G08C 23/04; G08C 2201/20; G08C 2201/21; G08C 2201/30; G08C 2201/92; G08C 2201/44505; G08C 2201/451; G11B 27/034; G11B 27/34; H04N 21/42204; H04N 21/42208; H04N 21/42224; H04N 21/42228; H04N 21/8186

See application file for complete search history.

(56) References Cited

U.S. PATENT DOCUMENTS

| | | | |
|---|---|---|---|
| 5,602,993 | A | 2/1997 | Stromberg |
| 5,909,545 | A | 6/1999 | Frese, II et al. |
| 5,940,074 | A | 8/1999 | Britt, Jr. et al. |
| 5,956,025 | A | 9/1999 | Goulden et al. |
| 5,960,189 | A | 9/1999 | Stupek et al. |
| 6,054,983 | A | 4/2000 | Simonoff et al. |
| 6,151,606 | A | 11/2000 | Mendez |
| 6,167,567 | A | 12/2000 | Chiles et al. |
| 6,170,065 | B1 | 1/2001 | Kobata et al. |
| 6,182,094 | B1 | 1/2001 | Humpleman et al. |
| 6,195,694 | B1 | 2/2001 | Chen et al. |
| 6,208,341 | B1 | 3/2001 | van Ee et al. |
| 6,211,870 | B1 | 4/2001 | Foster |
| 6,237,006 | B1 | 5/2001 | Weinberg et al. |
| 6,285,357 | B1 | 9/2001 | Kushiro et al. |
| 6,308,283 | B1 | 10/2001 | Galipeau et al. |
| 6,317,143 | B1 | 11/2001 | Wugofski |
| 6,397,186 | B1 | 5/2002 | Bush et al. |
| 6,437,836 | B1 | 8/2002 | Huang et al. |
| 6,487,717 | B1 | 11/2002 | Brunemann et al. |
| 6,496,927 | B1 | 12/2002 | McGrane et al. |
| 6,505,244 | B1 | 1/2003 | Natarajan et al. |
| 6,516,327 | B1 | 2/2003 | Zondervan et al. |
| 6,539,425 | B1 | 3/2003 | Stevens et al. |
| 6,587,067 | B2 | 7/2003 | Darbee et al. |
| 6,597,374 | B1 | 7/2003 | Baker et al. |
| 6,654,771 | B1 | 11/2003 | Parham et al. |
| 6,680,730 | B1 | 1/2004 | Shields et al. |
| 6,690,392 | B1 | 2/2004 | Wugoski |
| 6,747,591 | B1 | 6/2004 | Lilleness et al. |
| 6,751,794 | B1 | 6/2004 | McCaleb et al. |
| RE38,598 | E | 9/2004 | Frese, II et al. |
| 6,898,424 | B2 | 5/2005 | Nishida |
| 6,907,300 | B2 | 6/2005 | O'Mahoney et al. |
| 6,909,378 | B1 | 6/2005 | Lambrechts et al. |
| 6,989,763 | B2 | 1/2006 | Wall et al. |
| 7,024,548 | B1 | 4/2006 | O'Toole, Jr. |
| 7,047,092 | B2 | 5/2006 | Wimsatt |
| 7,055,759 | B2 | 6/2006 | Wacker et al. |
| 7,110,836 | B2 | 9/2006 | Sturm et al. |
| 7,159,185 | B1 | 1/2007 | Vedula et al. |
| 7,218,243 | B2 | 5/2007 | Hayes et al. |
| 7,234,115 | B1 | 6/2007 | Sprauve et al. |
| 7,240,289 | B2 | 7/2007 | Naughton et al. |
| 7,266,777 | B2 | 9/2007 | Scott et al. |
| 7,398,524 | B2 | 7/2008 | Shapiro |
| 7,433,943 | B1 | 10/2008 | Ford |
| 7,526,728 | B2 | 4/2009 | Apparao et al. |
| 7,530,024 | B2 | 5/2009 | Takahashi et al. |
| 7,734,724 | B2 | 6/2010 | Rezvani et al. |
| 2001/0011953 | A1 | 8/2001 | Shintani et al. |
| 2001/0042073 | A1 | 11/2001 | Saether et al. |
| 2002/0063633 | A1 | 5/2002 | Park |
| 2002/0063735 | A1 | 5/2002 | Tamir et al. |
| 2002/0100036 | A1 | 7/2002 | Moshir et al. |
| 2002/0124064 | A1 | 9/2002 | Epstein et al. |
| 2002/0140571 | A1 | 10/2002 | Hayes et al. |
| 2002/0141343 | A1 | 10/2002 | Bays |
| 2002/0143805 | A1 | 10/2002 | Hayes et al. |
| 2002/0154888 | A1 | 10/2002 | Allen et al. |
| 2002/0190956 | A1 | 12/2002 | Klein et al. |
| 2002/0194314 | A1 | 12/2002 | Kouznetsov et al. |
| 2002/0199025 | A1 | 12/2002 | Kutay et al. |
| 2003/0011634 | A1 | 1/2003 | Hasha et al. |
| 2003/0028538 | A1 | 2/2003 | Eikenbery |
| 2003/0070061 | A1* | 4/2003 | Wong .................. G06F 8/38 707/999.009 |
| 2003/0095156 | A1 | 5/2003 | Klein et al. |
| 2003/0103075 | A1 | 6/2003 | Rosselot |
| 2003/0103088 | A1 | 6/2003 | Dresti et al. |
| 2003/0117427 | A1 | 6/2003 | Haughawout et al. |
| 2003/0140120 | A1 | 7/2003 | Hartman |
| 2003/0141987 | A1 | 7/2003 | Hayes |
| 2003/0143991 | A1 | 7/2003 | Minear et al. |
| 2003/0164787 | A1* | 9/2003 | Dresti .................. G08C 17/00 348/E5.127 |
| 2003/0189509 | A1 | 10/2003 | Hayes et al. |
| 2003/0189905 | A1 | 10/2003 | Lee |
| 2003/0237082 | A1 | 12/2003 | Thurlow |
| 2004/0030768 | A1 | 2/2004 | Krishnamoorthy et al. |
| 2004/0044454 | A1 | 3/2004 | Ross et al. |
| 2004/0049771 | A1 | 3/2004 | Yu |
| 2004/0100490 | A1 | 5/2004 | Boston et al. |
| 2004/0103032 | A1 | 5/2004 | Maggio |
| 2004/0107417 | A1 | 6/2004 | Chia et al. |
| 2004/0133629 | A1 | 7/2004 | Reynolds et al. |
| 2004/0210825 | A1 | 10/2004 | Novak et al. |
| 2004/0235463 | A1 | 11/2004 | Patel |
| 2004/0248621 | A1 | 12/2004 | Schon |
| 2005/0028104 | A1 | 2/2005 | Apparao et al. |
| 2005/0052423 | A1 | 3/2005 | Harris et al. |

(56) References Cited

U.S. PATENT DOCUMENTS

| | | |
|---|---|---|
| 2005/0071749 A1 | 3/2005 | Goerke et al. |
| 2005/0120301 A1 | 6/2005 | Humpleman et al. |
| 2005/0256590 A1 | 11/2005 | Choi |
| 2005/0267928 A1 | 12/2005 | Anderson et al. |
| 2005/0275626 A1 | 12/2005 | Mueller et al. |
| 2006/0050142 A1 | 3/2006 | Scott et al. |
| 2006/0056802 A1 | 3/2006 | Seo et al. |
| 2006/0143572 A1 | 6/2006 | Scott et al. |
| 2006/0244625 A1 | 11/2006 | Veridckt et al. |
| 2006/0288300 A1 | 12/2006 | Chambers et al. |
| 2007/0063860 A1 | 3/2007 | Escobosa et al. |
| 2007/0155418 A1 | 7/2007 | Shau et al. |
| 2007/0165555 A1 | 7/2007 | Deng et al. |
| 2007/0169073 A1 | 7/2007 | O'Neill et al. |
| 2007/0279244 A1 | 12/2007 | Haughawout et al. |
| 2008/0122675 A1 | 5/2008 | Bilodeau et al. |
| 2010/0223551 A1 | 9/2010 | Twig et al. |
| 2010/0235633 A1 | 9/2010 | Asano et al. |
| 2022/0051554 A1 | 2/2022 | Tchedikian et al. |
| 2022/0053230 A1 | 2/2022 | Tchedikian et al. |

OTHER PUBLICATIONS

Cheng, Hong. Monitoring Network Quality of Service in a Dynamic Real-Time System. Mar. 2003. College of Engineering and Technology of Ohio University. pp.s 1-84. (Year: 2003).*

Bakker, J.L., Design and evaluation of the distributed software component framework for distributed communication architectures, IEEE, Nov. 5, 1998.

Song, H., et al., Secure remote control of field-programmable network devices, IEEE, Apr. 23, 2004.

WIPO, International Preliminary Report on Patentability of PCT Appln. No. US09/066800, dated Jun. 7, 2011, 7 pages.

Office Action issued by Examiner Baoquoc N. To dated May 29, 2009 for U.S. Appl. No. 11/479,547.

European Patent Office, Supplementary European Search Report of EP Application No. 09831203, 7 pages.

Leeb et al., A Configuration Tool for HomeNet, Aug. 1996, IEEE Transactions on Consumer Electronics, vol. 42, Issue 3, pp. 387-394.

European Patent Office, extended European Search Report issued on European patent application No. 17183913.7, dated Jan. 17, 2018, 5 pages.

U.S. Patent and Trademark Office, Non-Final Office Action issued in U.S. Appl. No. 17/410,054, dated Jul. 12, 2022, 21 pgs.

U.S. Patent and Trademark Office, Non-Final Office Action issued in U.S. Appl. No. 17/686,710, dated Oct. 26, 2022, 14 pgs.

Cheng, Hong. Monitoring Quality of Service in a Dynamic Real-Time System. Mar. 2003. College of Engineering and Technology of Ohio University. pp. 1-84. (Year: 2003).

* cited by examiner

SYSTEM AND METHOD FOR FLEXIBLE CONFIGURATION OF A CONTROLLING DEVICE

RELATED APPLICATION INFORMATION

This application claims the benefit of and is a continuation of U.S. application Ser. No. 17/686,710, filed on Mar. 4, 2022, which application claims the benefit of and is a continuation of U.S. application Ser. No. 17/410,054, filed on Dec. 9, 2021, which application claims the benefit of and is a continuation of U.S. application Ser. No. 16/596,622, Oct. 8, 2019, which application claims the benefit of and is a continuation of U.S. application Ser. No. 15/632,775, filed on Jun. 26, 2017, which application claims the benefit of and is a continuation of U.S. application Ser. No. 13/673,271, filed on Nov. 9, 2012, which application claims the benefit of and is a divisional of U.S. application Ser. No. 12/629,423, filed on Dec. 2, 2009, which application claims the benefit of U.S. Provisional Patent Application No. 61/201,021, filed on Dec. 5, 2008, and which also claims the benefit of and is a continuation-in-part of U.S. application Ser. No. 11/357,681, filed Feb. 16, 2006, which in turn is a continuation-in-part of U.S. application Ser. No. 11/218,900 (now U.S. Pat. No. 7,266,777), filed on Sep. 2, 2005, which in turn claims the benefit of U.S. Provisional Patent Application Nos. 60/608,183, filed on Sep. 8, 2004, and U.S. Provisional Patent Application No. 60/705,926, filed on Aug. 5, 2005.

Each of these applications is incorporated herein by reference in their entirety.

BACKGROUND

The following relates generally to controlling devices and, more particularly, to a configurable controlling device having an associated editor program for use in configuring, among other things, the user interface and functionality of the controlling device.

Editor programs for configuring a controlling device, such as a hand held remote control, are known in the art. For example, U.S. Pat. No. 6,211,870 illustrates and describes a controlling device which is programmable from a PC using an advanced, object-oriented user interface. More particularly, multiple user selectable screen objects may be created on the PC and transferred to the controlling device. The screen objects include screen layout and descriptions of soft keys to be displayed on a graphic display of the controlling device, as well as commands associated with the screen object, the soft keys and/or programmable keys on the remote control unit. The user may then select any of the screen objects once they have been transferred to the controlling device to control the operation of various appliances.

Similarly, PCT published application no. WO 00/39772 discloses a universal, programmable remote control device which has programming that enables an end-user to customize the remote control device through editing or programming of the control functionalities of the remote control device. The programming is achieved via a PC. In this manner, the control configuration created via an editor on the PC can be downloaded into the device. It is additionally disclosed that the PC has emulator software to test the configuration before downloading. It is to be understood that WO 00/39772 generally discloses the editor for the Philips' "Pronto" brand remote control.

Increasingly, such programmable controlling devices are utilized in environments which include networked and/or interactive appliances. While these known controlling devices and associated editor programs do continue to work for their intended purpose in such environments, programming of these controlling devices has become increasingly tedious and in many instances cannot be accomplished without a detailed knowledge of the exact configuration of the target appliance network or, in some cases, without the physical presence of a fully operational appliance network during the programming process.

SUMMARY

The following generally discloses an editor program for use in configuring a user interface of a controlling device, together with a configurable controlling device such as a hand-held remote control unit. The editor program allows a user to create on a personal computer for downloading to the controlling device a graphical user interface comprised of user interface pages having icons which icons, when activated on the controlling device, cause the controlling device to perform a function, such as to transmit a command to an appliance, to change the user interface display, etc. The editor program provides, among other things, for selection and placement of icons onto user interface display pages, assignment of commands to function keys (both iconic and hard keys), assignment of backgrounds to user interface pages or groups of pages, creation of icon-activated user-defined command sequences, pre-rendering of user interface pages prior to downloading of the user interface to the controlling device, etc. Advantageously, in an exemplary embodiment the user interface editor and the operating software of the controlling device may also support the creation and editing of n-state widgets, which are unitary GUI objects comprising one or more touch activated areas together with one or more display graphics (not necessarily in a one-for-one relationship) and which are capable of both initiating parameterized command functions in response to touch inputs, as well as receiving and acting upon status responses from target appliances. Each of the attributes of an n-state widget (touch area(s), command functions, display data, response behavior) are abstracted from the others and may be independently edited, and not all are required to be present in a given instance of such a widget.

In a further advantageous embodiment, the user interface editor may provide for the creation of virtual devices, that is, appliances which are defined in terms of abstract functionality without any attachment to a physical network address, command transmission format, etc. Using such virtual devices, a complete graphical user interface system may be designed and implemented independently of actual target appliance and network specifications. Upon download of such GUI programming into a compatible controlling device, the operating software of the controlling device may guide a user through a setup process in which virtual devices are linked to physical appliances present in that controlling device's environment. In this manner, graphical user interface system development is enabled without necessitating the physical presence of target appliances, as well as the creation of template GUIs which may be reused multiple times in different appliance environments.

The various advantages, features, properties and relationships of this improved user interface editor and controlling device system will be obtained from the following detailed description and accompanying drawings which set forth illustrative embodiments which are indicative of the various ways in which the principles thereof may be employed.

BRIEF DESCRIPTION OF THE DRAWINGS

For use in better understanding the user interface editor and configuration distribution system and related methods described hereinafter reference may be had to the following drawings in which.

DETAILED DESCRIPTION

Figure 1:
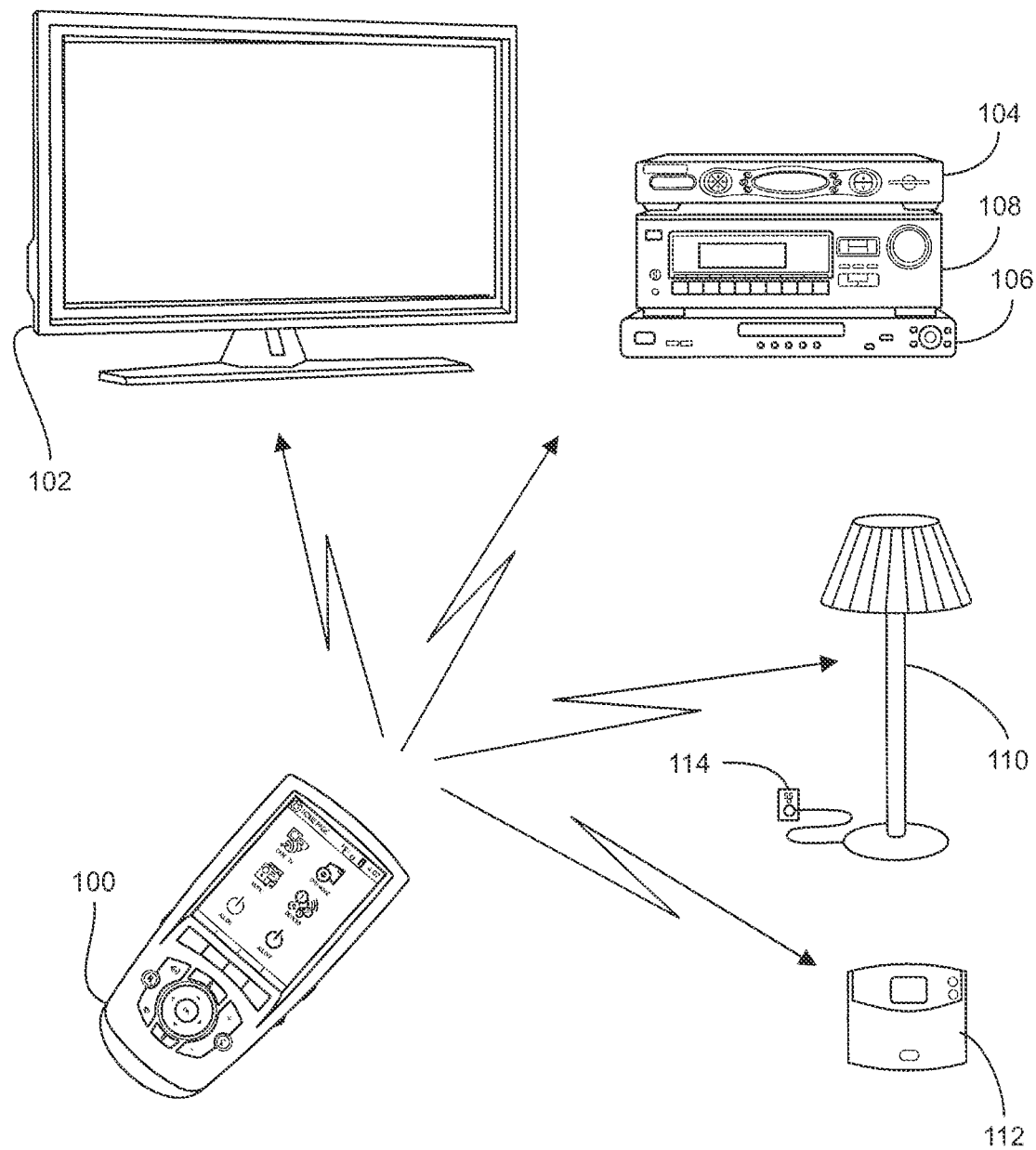
FIG. 1 illustrates an exemplary home entertainment system in which the exemplary controlling devices may be utilized.

The following discloses a controlling device having a face panel on which is carried a user interface activatable to cause transmission of at least one command to at least one appliance. Turning now to the figures, wherein like reference numerals refer to like elements, FIG. 1 illustrates an exemplary system including controllable appliances, such as a set top box ("STB") 104, a DVD player 106, an audio amplifier/receiver 108, a television 102, a lighting fixture 110 and associated multilevel dimmer 114, and a thermostat 112 as well as a controlling device 100. The controlling device 100 is capable of transmitting commands to the appliances, using any convenient IR or RF, point-to-point or networked, protocol to cause the appliances to perform operational functions. While illustrated in the context of a STB 104 with DVD player 106, audio system 108, television 102, lighting fixture 110 and thermostat 112 it is to be understood that controllable appliances can include, but are not limited to, televisions, VCRs, DVRs, DVD players, cable or satellite converter set-top boxes (STBs), amplifiers, media streaming devices, CD players, game consoles, home lighting, drapery controls, fans, HVAC systems, thermostats, door locks, security systems and cameras, personal computers, etc., and, as such, the instant exemplary disclosures are not intended to be limiting as to type or quantity of controllable appliances or equipment.

Figure 2:
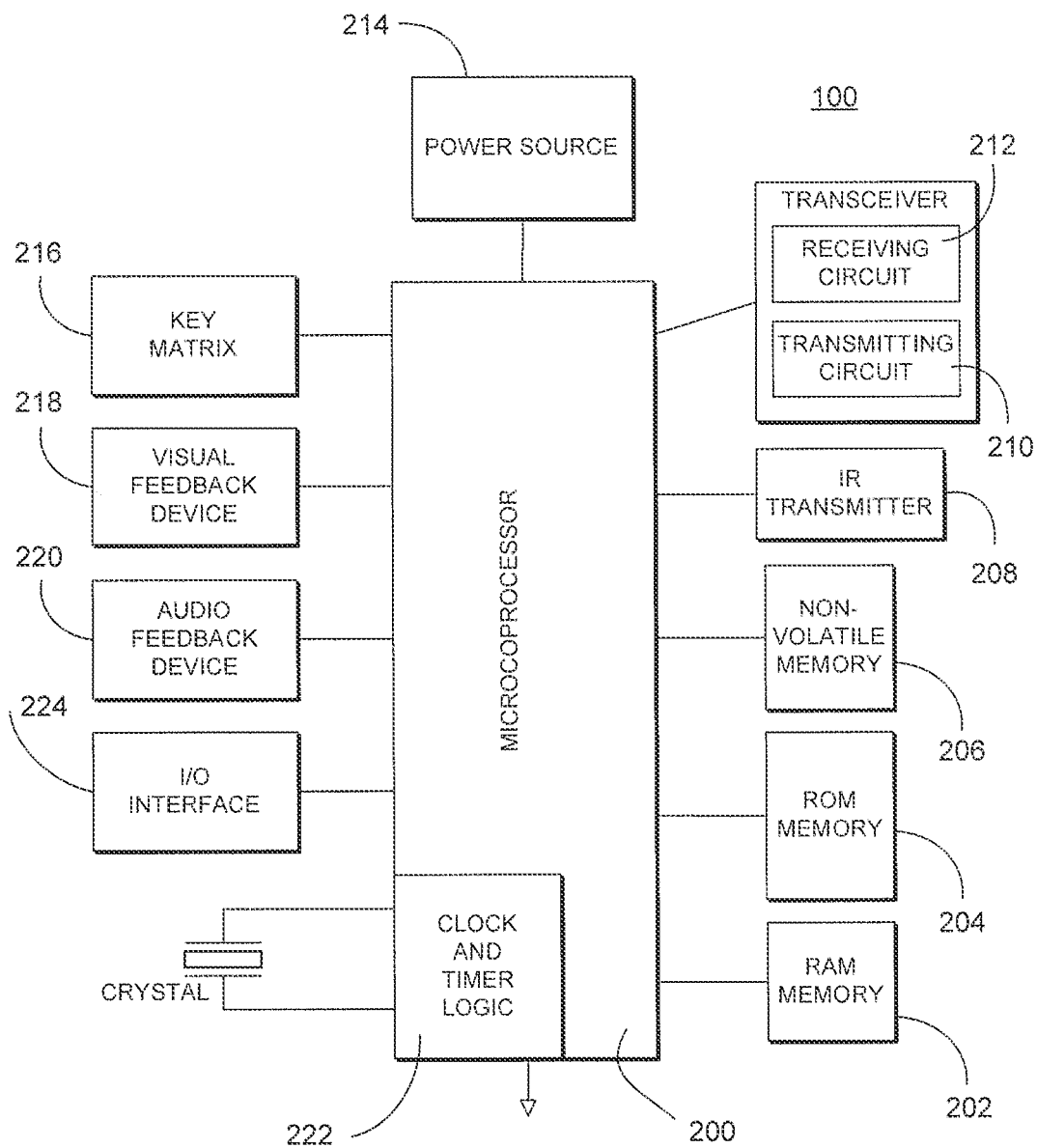
FIG. 2 illustrates a block diagram of components of an exemplary controlling device.

Turning now to FIG. 2, for use in transmitting command codes to one or more of the appliances, the controlling device 100 of the exemplary system may include, as needed for a particular application, a processor 200 coupled to a memory device (such as ROM memory 204, RAM memory 202, and/or a non-volatile memory 206), a key matrix 216 (e.g., physical buttons, a touch sensitive display with soft keys, or a combination thereof), an internal clock and timer 222, an IR (and/or RF) transmitter 208 for directly issuing commands to controlled appliances, one or more RF (and/or IR) wireless transmission and reception circuit(s) 210, 212 for issuing commands to controlled appliances via a network and/or transferring data or commands between the controlling device and other networked controlling devices or external computing devices such as a PC, a physical input/output interface 224 for use in directly transferring data between the controlling device and an external computing devices such as a PC, STB, etc., a means 218 to provide visual feedback to the user (e.g., LCD display or the like, which may underlay all or part of a touch sensitive portion of key matrix 216), a means 220 to provide audio feedback (speaker, buzzer, etc.) and a power supply 214 all as generally illustrated in FIG. 2. As will be understood by those of skill in the art, the memory device(s) may include executable instructions that are intended to be executed by the processor 200 to control the operation of the controlling device 100.

The non-volatile read/write memory 206, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 202, 204, and 206 may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of a data or signal transmission, etc. In response to an event appropriate instructions within the memory may be executed. For example, when a command key is activated on the controlling device 100, the controlling device 100 may retrieve a command code corresponding to the activated command key from memory 204 or 206 and transmit the command code to a device in a format recognizable by the device. It will be appreciated that the instructions within the memory can be used not only to cause the transmission of command codes and/or data to the appliances but also to perform local operations. While not limiting, other local operations that may be performed by the controlling device 100 include execution of pre-programmed macro command sequences, displaying information/data, manipulating the appearance of a graphical user interface presented on a local LCD display 218, etc., and in an exemplary embodiment illustrative of the instant inventive concepts, managing the linkage between virtual devices defined by a GUI editing program and real devices present in the controlled environment. For convenience and economy of development effort, the software programming of controlling device 100 may utilize an underlying operating system such as, for example, Microsoft's "Windows CE" or "Windows Mobile" brand operating systems.

Figure 3A:
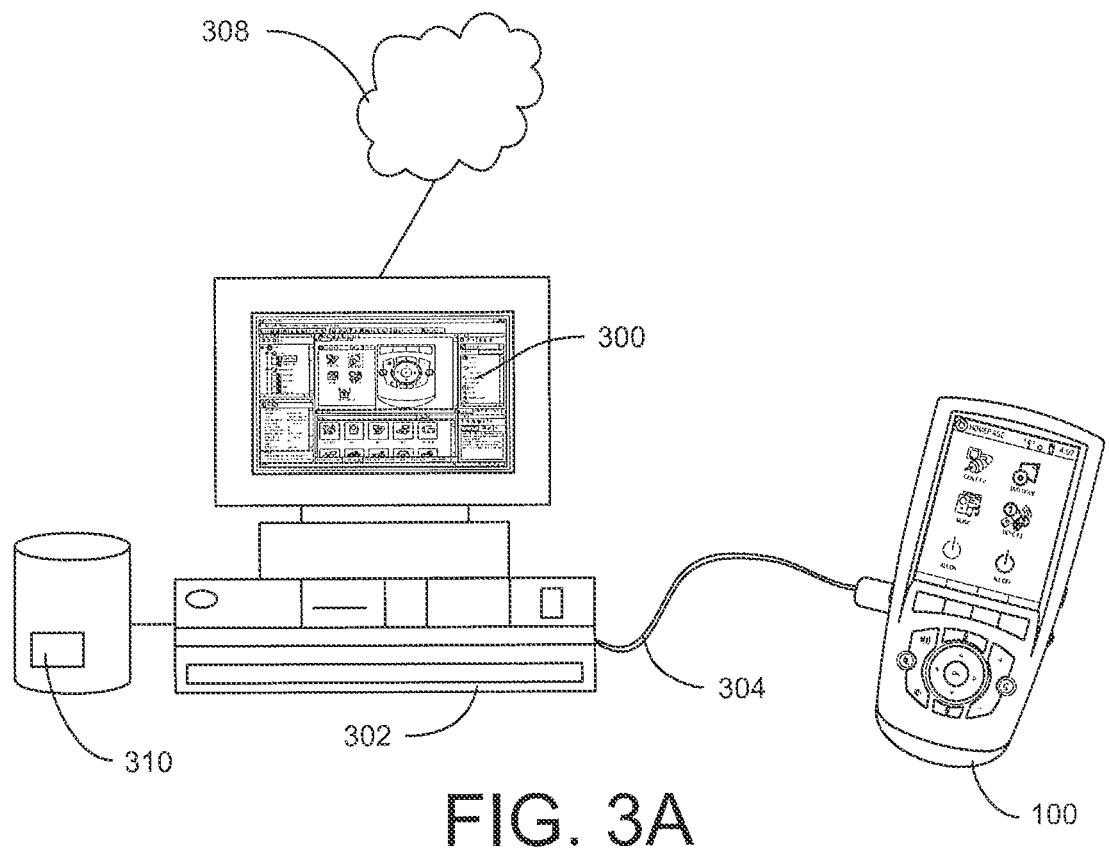
FIGS. 3a and 3b illustrates exemplary editing systems which may be used to configure and download a controlling device configuration, including a user interface, to an exemplary controlling device.
Figure 3B:
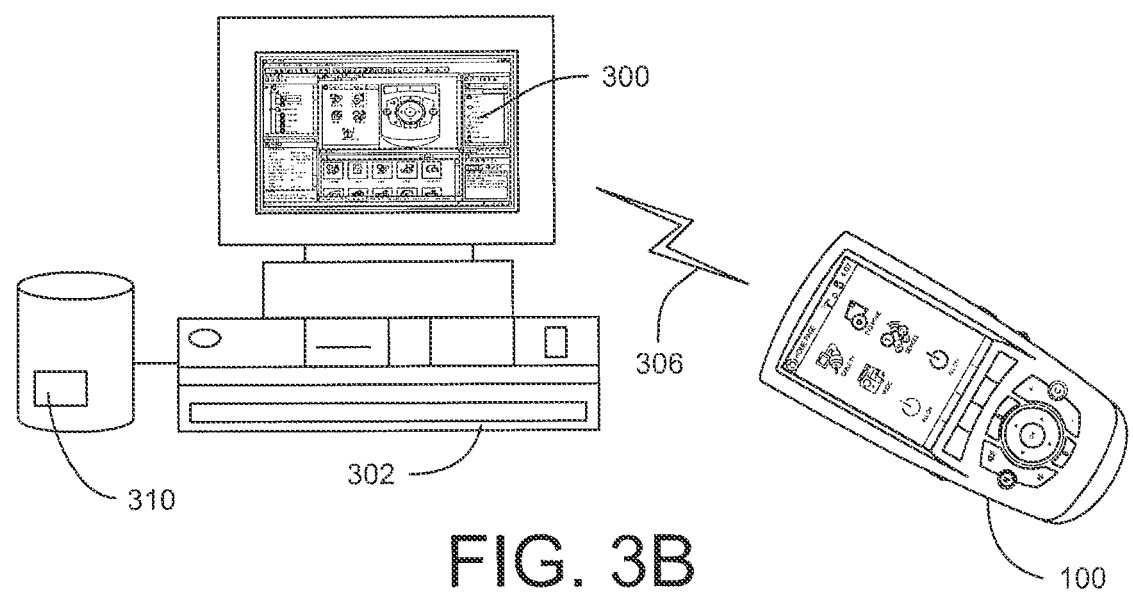
Figure 4:
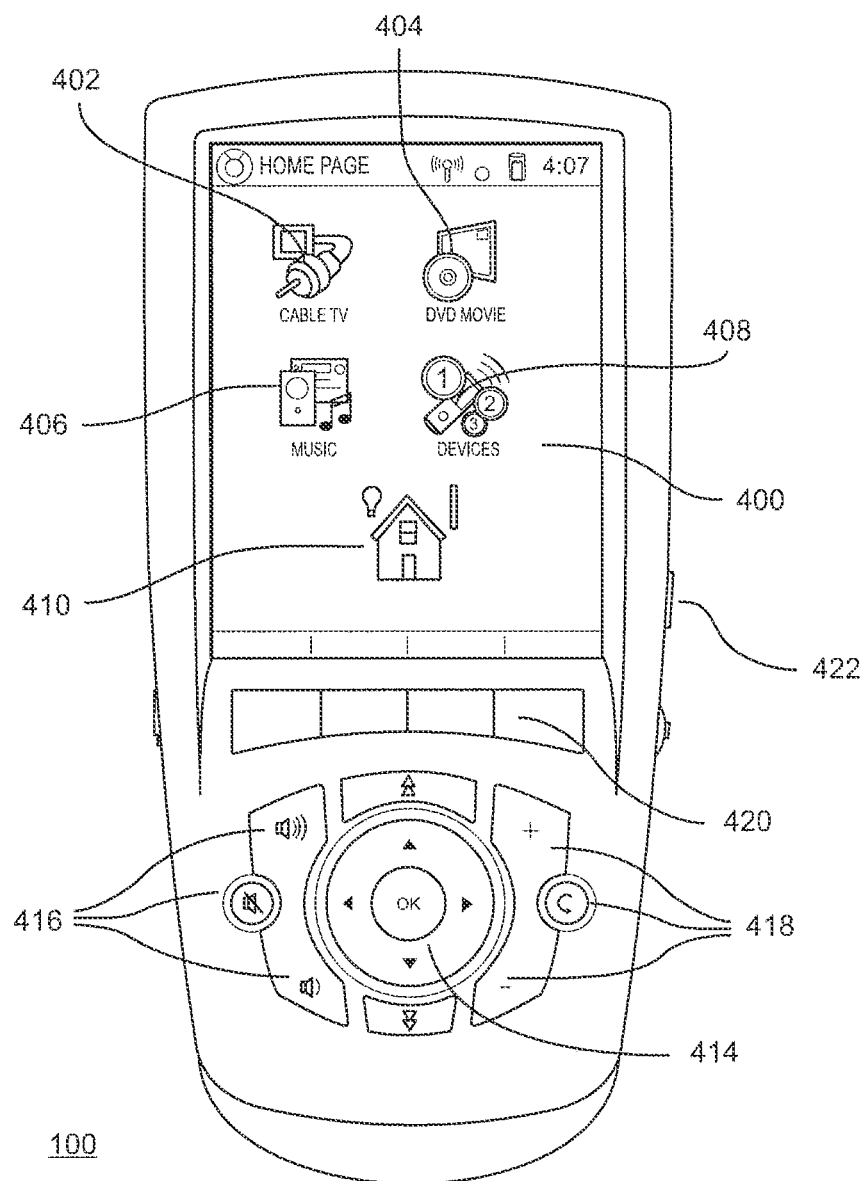
FIG. 4 illustrates an exemplary home page graphical user interface ("GUI") for a touch screen of a controlling device.

As contemplated in the above referenced and related U.S. patent application Ser. Nos. 11/357,681 and 11/218,900 and provisional applications 60/608,183 and 60/705,926, the graphical user interface ("GUI") and certain functionalities of controlling device 100 may be defined via a software based editing tool 300 which may be supplied as an application program to be installed on a PC 302 running an operating system, for example, a Microsoft "Windows" brand operating system, as generally illustrated in FIGS. 3a and 3b and described in further detail hereinafter. In the illustrative examples that follow, it will be appreciated by those skilled in the art that development tools such as Microsoft's Visual Studio, the C#programming language, and various third party libraries may be used to facilitate creation of the software comprising exemplary editing tool 300 and exemplary controlling device 100 GUI and functionality.

Editor application 300 may be offered by the manufacturer of the controlling device 100 on a CD ROM, for download from a Web site, etc., as appropriate for installation on a PC of the user's choice. Once the editor application is installed on the user's PC 302, the controlling device GUI may be created or revised using the editor application, stored locally as a file 310 on PC 302 and/or caused to be downloaded into controlling device 100 via a hardwired connection 304, a wireless link 306 (e.g., WiFi, Bluetooth, Zigbee, etc.) or any other convenient means. Additionally, it will be appreciated that the editor application 300, although primarily resident on the user's local PC 302, may also be adapted to access additional data items from remotely located servers via the Internet 308, from appliances linked to the PC 302 via a home network, etc. Examples of such items may include, without limitation, IR command codes (e.g., to allow for support of new appliances), data which indicates operations supported by an appliance, device model number cross-references (e.g., for entering into the controlling device for set-up purposes as disclosed in, for example, U.S. Pat. No. 6,587,067), operational software updates for controlling device 100, etc. It will also be appreciated that in such an environment data may also be uploaded from PC 302 to a centralized repository, e.g., a remotely located, Internet accessible server. Such uploaded information may include, for example, current user configurations, learned IR code data, etc., and may be comprised of or derived from data stored locally on PC 302 (for example, file 310) and/or data retrieved from controlling device 100 during the times controlling device 100 is coupled to PC 302.

Certain aspects of the operation of exemplary controlling device 100 will now be discussed in conjunction with FIGS. 4 through 8. In this context, as will be appreciated by those familiar with the relevant art and/or with the previously referenced parent and U.S. provisional applications, the actual appearance and functionality of all the GUI pages in controlling device 100 represent only one instance of the output of editor application 300. It will thus be understood that the GUIs and associated functionality presented herein are by way of example only and not intended to be limiting in any way.

Controlling device 100 may include both a touch activated LCD screen 218 with soft keys (or other form of touch panel) and several groups of hard buttons 414, 416, 418, 420. The hard buttons groups might comprise, for example, a volume control group 416 (e.g., volume up, down, and mute), a channel changing group 418 (e.g., channel up, down, and return), a navigation group embodied in disk 414 (e.g., for menu navigation and selection including up, down, left, right, and enter/select), and/or a row of programmable keys 420 (e.g., keys for supporting macros or other to-be-configured functions).

Figure 5:
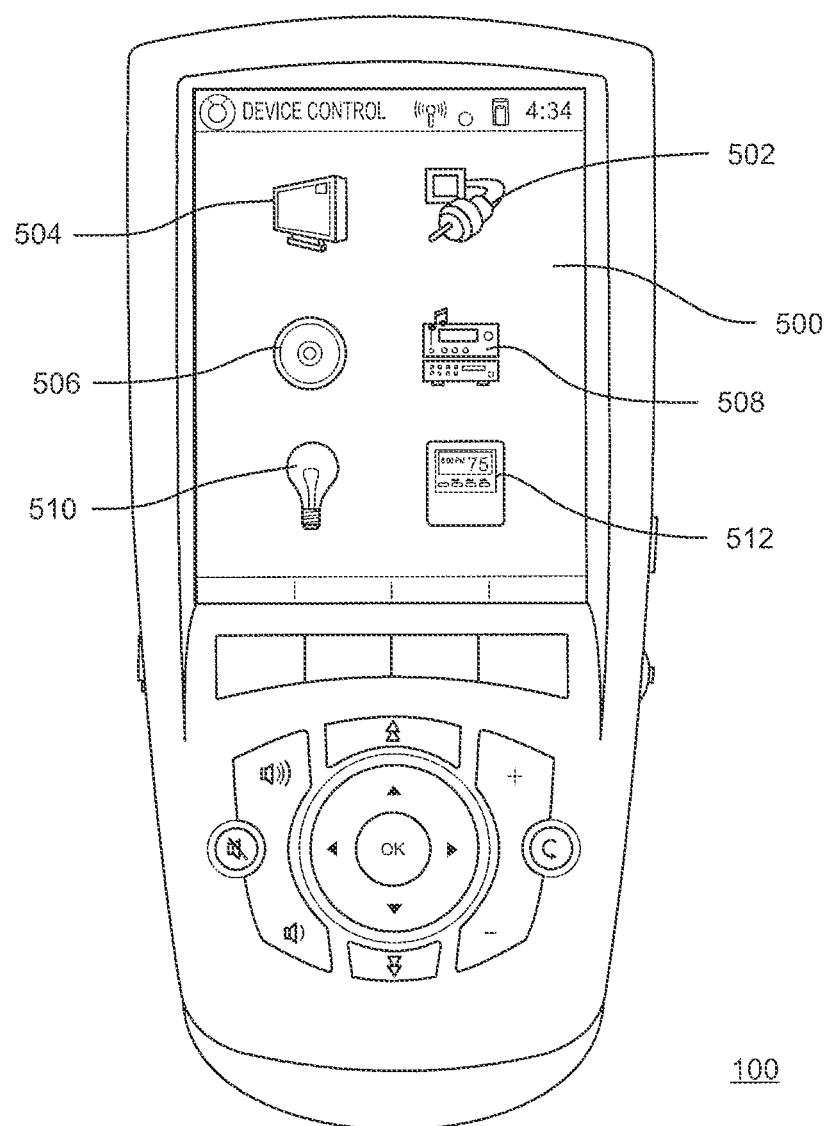
FIG. 5 illustrates an exemplary device selection page GUI for the touch screen of a controlling device.
Figure 6:
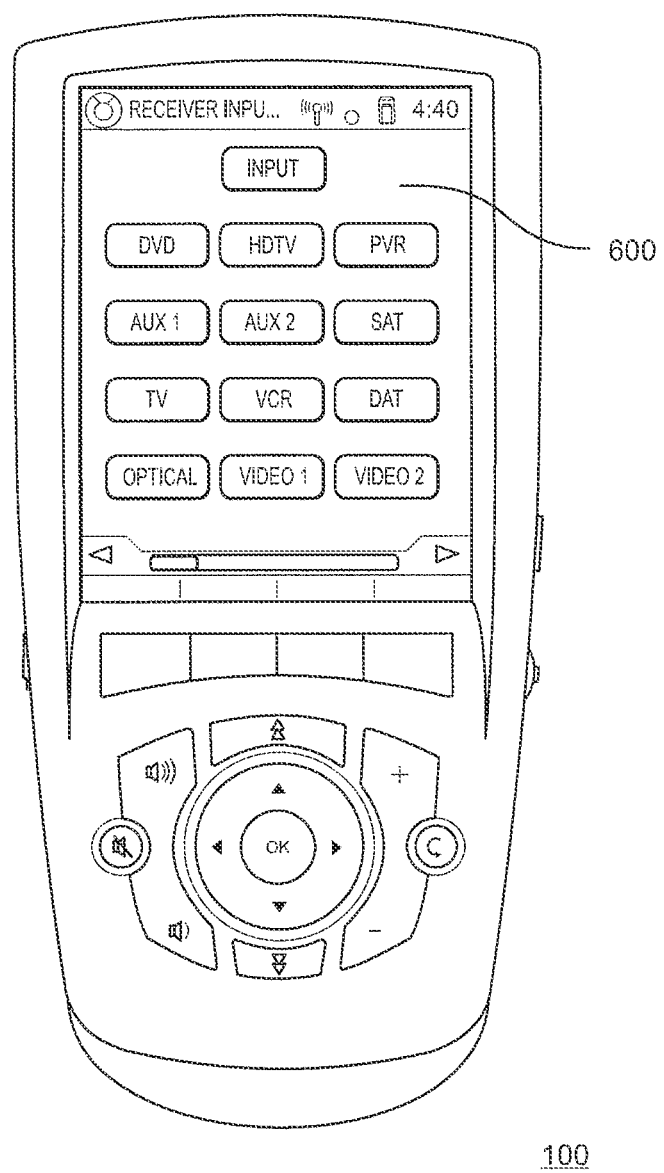
FIG. 6 illustrates an exemplary device control page GUI for the touch screen of a controlling device.
Figure 7:
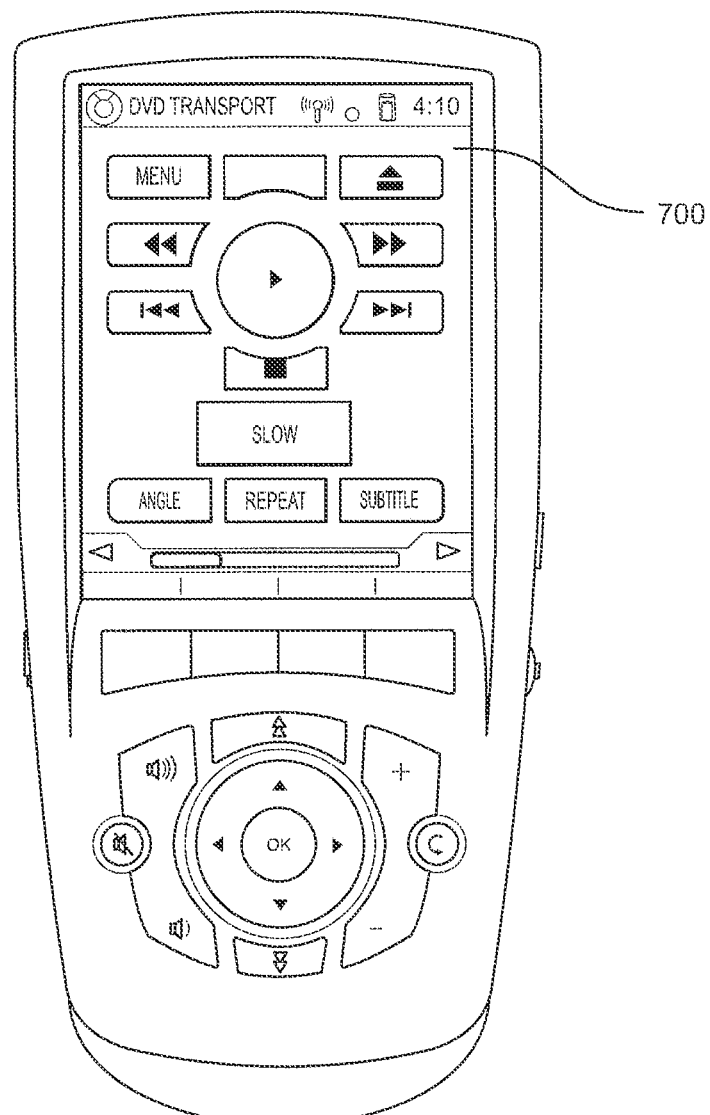
FIG. 7 illustrates another exemplary device control page GUI for the touch screen of a controlling device.
Figure 8:
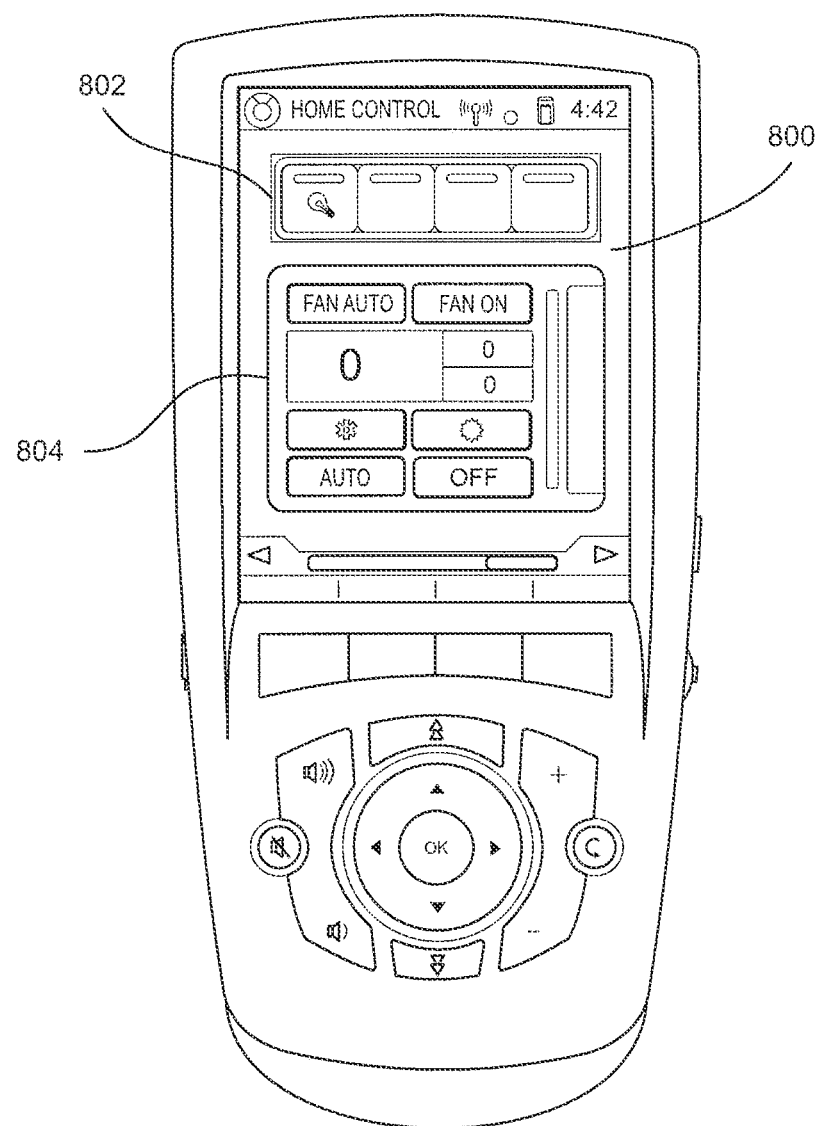
FIG. 8 illustrates yet another exemplary device control page GUI for the touch screen of a controlling device.

Upon start of operation, or any time the "Home" button 422 (e.g., on the side of the device) is activated, an exemplary Home Page GUI 400 may be presented within the display. The illustrated, exemplary home Page 400 includes five touch-activated buttons. By way of example only, touching icon 402 may be used to initiate the activity of watching cable TV by causing controlling device 100 to transmit the commands required to power on cable STB 104, power on TV 102, select the TV input to which the cable STB is connected, and then cause the controlling device GUI to transition to a page (e.g., display having soft keys, an EPG, or the like) from which cable STB channel selection may be input (for further tuning, retrieving related content information, etc.). Touching icon 404 may be used to similarly cause the controlling device to place the entertainment system into a condition suitable for watching a DVD movie, while touching icon 406 may be used to cause the controlling device to place the system into a condition suitable for listening to music. Touching icon 410 may be used to cause the controlling device to transition to another page 800 of the GUI (an example of which is shown in FIG. 8) from which home automation functions such as control of illumination levels, room temperature, etc. may be initiated. Touching icon 408 may be used to cause the controlling device to transition to another page 500 of the GUI (an example of which is shown in FIG. 5) from which individual appliance control pages may be called up, i.e., navigated to, using icons 502 (cable STB), 504 (TV), 506 (DVR player), 508 (audio receiver), 510 (lighting), and 512 (thermostat). Examples of individual appliance control pages are shown in FIG. 6 (GUI page 600 having soft keys for use in controlling receiver input selection commands), FIG. 7 (GUI page 700 having soft keys for use in controlling DVD transport functions), and FIG. 8 (GUI page 800 comprising a pair of n-state widgets 802 and 804 for controlling multi-level dimmable lamp 110 and thermostat 112 respectively.) In this way it will be understood and appreciated that a plurality of commands and/or actions may be performed both locally on controlling device 100 and remotely on the various appliances under the control of controlling device 100 in response to a single or multiple interaction(s) by a user with the key matrix 216 of controlling device 100.

Figure 9:
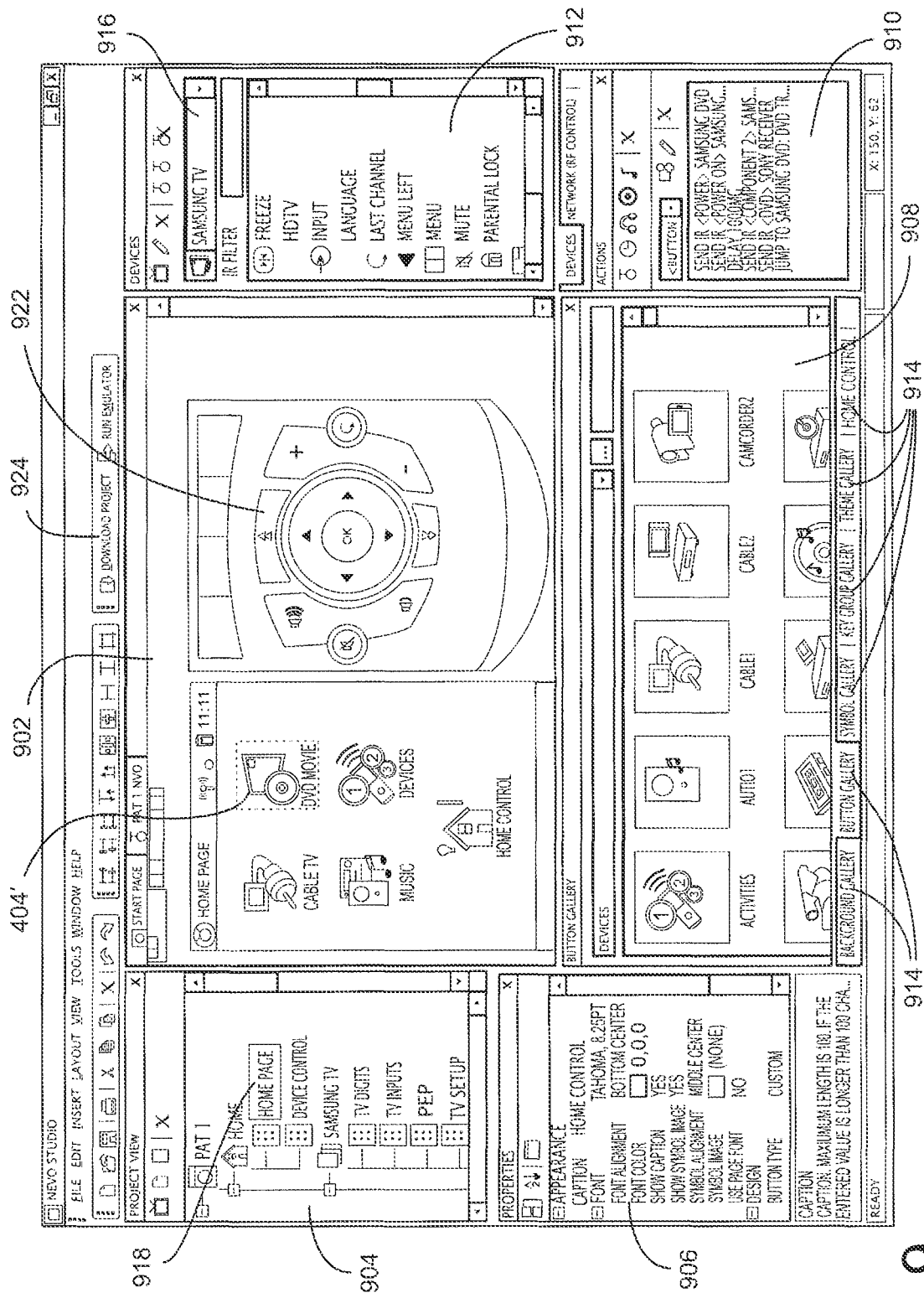
FIG. 9 illustrates an exemplary PC-based editor used to create the appearance and functionality of the GUI of FIG. 4.
Figure 10:
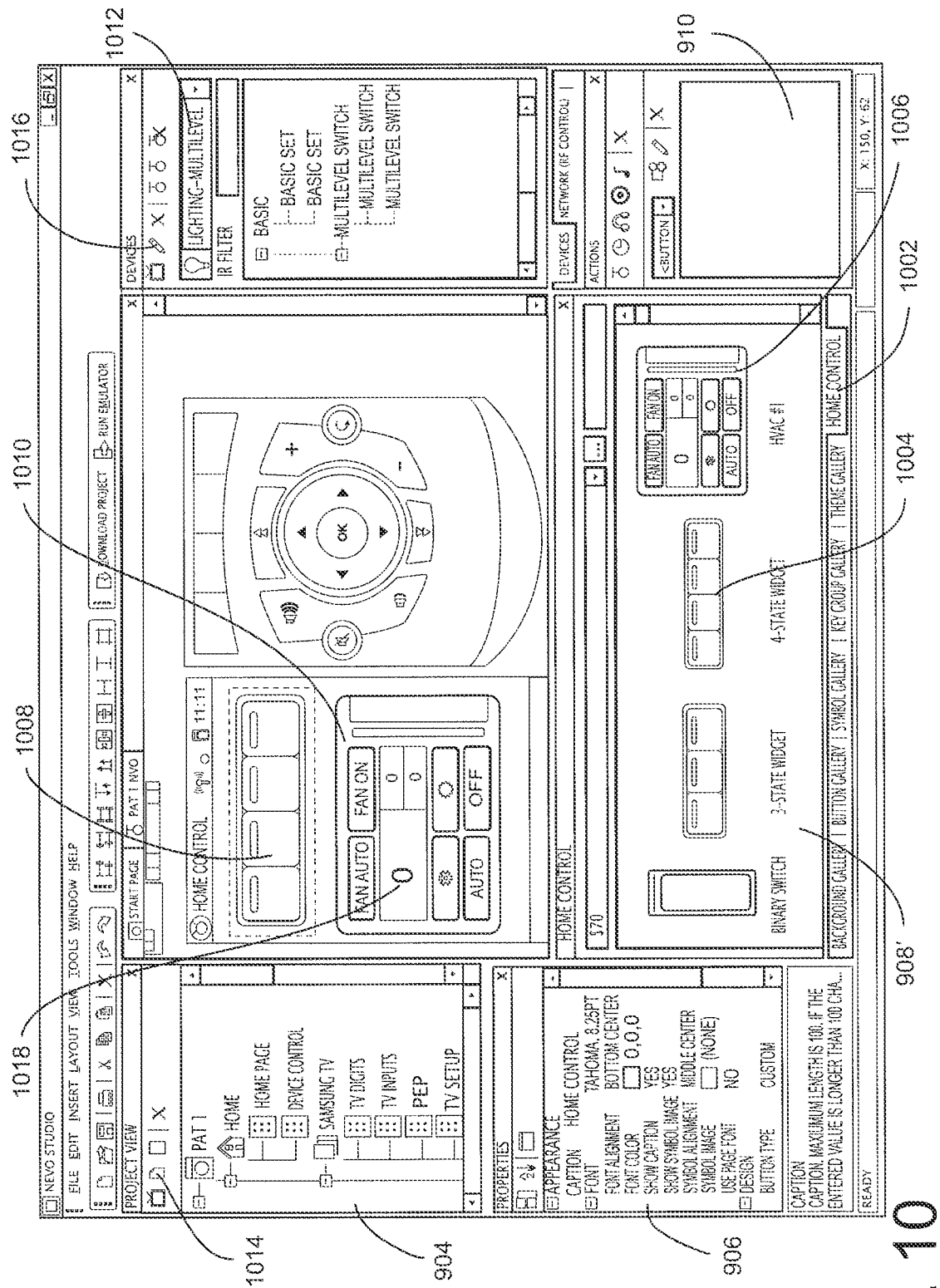
FIG. 10 illustrates an exemplary PC-based editor as used to create the appearance and functionality of the GUI of FIG. 8.

Turning now to FIG. 9, the operation of the editing program 300 used to create the above-disclosed, exemplary GUI pages and associated functionality will be described in further detail. For this purpose, the PC screen display of the editor application may be divided into several windows or panels, each having a specific purpose. By way of example, the panels may be as follows:

Main project panel 902, used to display the current GUI page being edited (Home Page 400 in this illustration) together with a representation 922 of the hard keys (keys 414 through 420) available on target controlling device 100;

Project View panel 904, used to display all currently defined GUI pages in a tree structure form (which may, as depicted in the exemplary embodiment shown, have collapse [−] and expand [+] functionality including selective expansion of individual nodes and/or a collapse all/expand all feature) where the GUI page to be edited may be selected (e.g., by clicking on a link) from within the tree structure list and wherein the GUI page being displayed in the Main project panel 902 may be indicated by a highlight 918 (the Home Page in the instant illustration);

Properties panel 906, used to display a list of (and allow editing of—for example by text entry, selection from drop down menus, etc.) the properties (such as the caption text and font attributes, symbol position, button type, etc.) associated with a presently selected GUI icon or hard key image within Main project panel 902 (GUI icon or soft key 404' with label "DVD Movie" in this illustration, as indicated by the highlight (dotted line) around icon 404' displayed in Main project panel 902);

Gallery panel 908, used to display graphic images which may be dragged and dropped onto the GUI pages being edited wherein the Gallery choices may include sets of icons for use as buttons, page backgrounds, symbols for labeling buttons, key groups (to allow a group of related key icons, e.g. a numeric pad, to be dragged into place in a single operation), to allow pre-defined themes to be applied to single pages or groups of pages, or in an exemplary embodiment to allow home control interface items such as n-state widgets to be dragged and dropped onto GUI pages being edited, and wherein the Gallery in use (when multiple, organized Galleries are provided) is selected via tabs 914 according to the exemplary embodiment shown;

Actions panel 910, used to display a list of (and allow editing of—for example by dragging and dropping to change the order, by deleting selected items, etc.) the actions to be performed by controlling device 100 when the currently selected icon (in the Main panel 902) is activated by a user when the user interface is provided to the controlling device (e.g., in the example presented, it can be seen that activating the "DVD Movie" icon 404' will: (1) transmit a "Power On" command to DVD player 106, (2) transmit a "Power On" command to TV set 102, (3) wait one second for the devices to stabilize, then (4) transmit a "Component 2" input selection command to TV 102, (5) transmit "DVD" input selection command to Audio Receiver 108, and finally (6) jump to GUI page 700 corresponding to the DVD transport controls (illustrated in FIGS. 7 and 10); and Devices panel 912 which is preferably used to display a listing of all remote control commands available for each of the appliances setup to be controlled by controlling device 100 wherein the list of commandable functions for a given appliance to be displayed may be selected from a drop down list 916 (which in the illustrative example would comprise a TV 102, a cable STB 104, a DVD player 106, and an audio receiver 108) and wherein the commandable functions so displayed may be assigned to any icon displayed in main project panel 902 by simply clicking and dragging a commandable function icon to, for example, a desired location with a listing of functions displayed in the Actions panel 910 and/or over an icon displayed in the Main panel (where it would be added, for example, to the top or bottom of the listing of commands within the Action panel display).

The operation of an exemplary editing program 300 used to create the above-disclosed, illustrative "Home control" GUI page 800 will be now described in further detail with reference to FIGS. 10 through 13. After selection of the appropriate GUI page from the page tree of Project View panel 904 (or creation of a new page via "add page" tab 1014 if no such page yet exists), selection of Home Control tab 1002 of the gallery panel may result in the display of various home control widgets 908' available for use in configuring the controlling device GUI. In an illustrative example, a 4-state lighting control widget 1004 and thermostat control widget 1006 may be selected and dragged onto the GUI page currently under definition, at locations 1008 and 1010 respectively. Thereafter, these widgets may be associated with appliances to be controlled by selecting an appropriate appliance in devices panel 912 to be dragged and dropped onto each widget. By way of illustration, in the example presented a template multilevel lighting device 1012 has been selected and associated with widget icon 1008. In this regard, in certain instances such devices may take the from of generic templates with the final linkage of GUI widgets to specific physical appliances deferred until such time as the completed GUI configuration is downloaded and installed on a specific controlling device, as will be described in greater detail in a subsequent section of this document.

Figure 11:
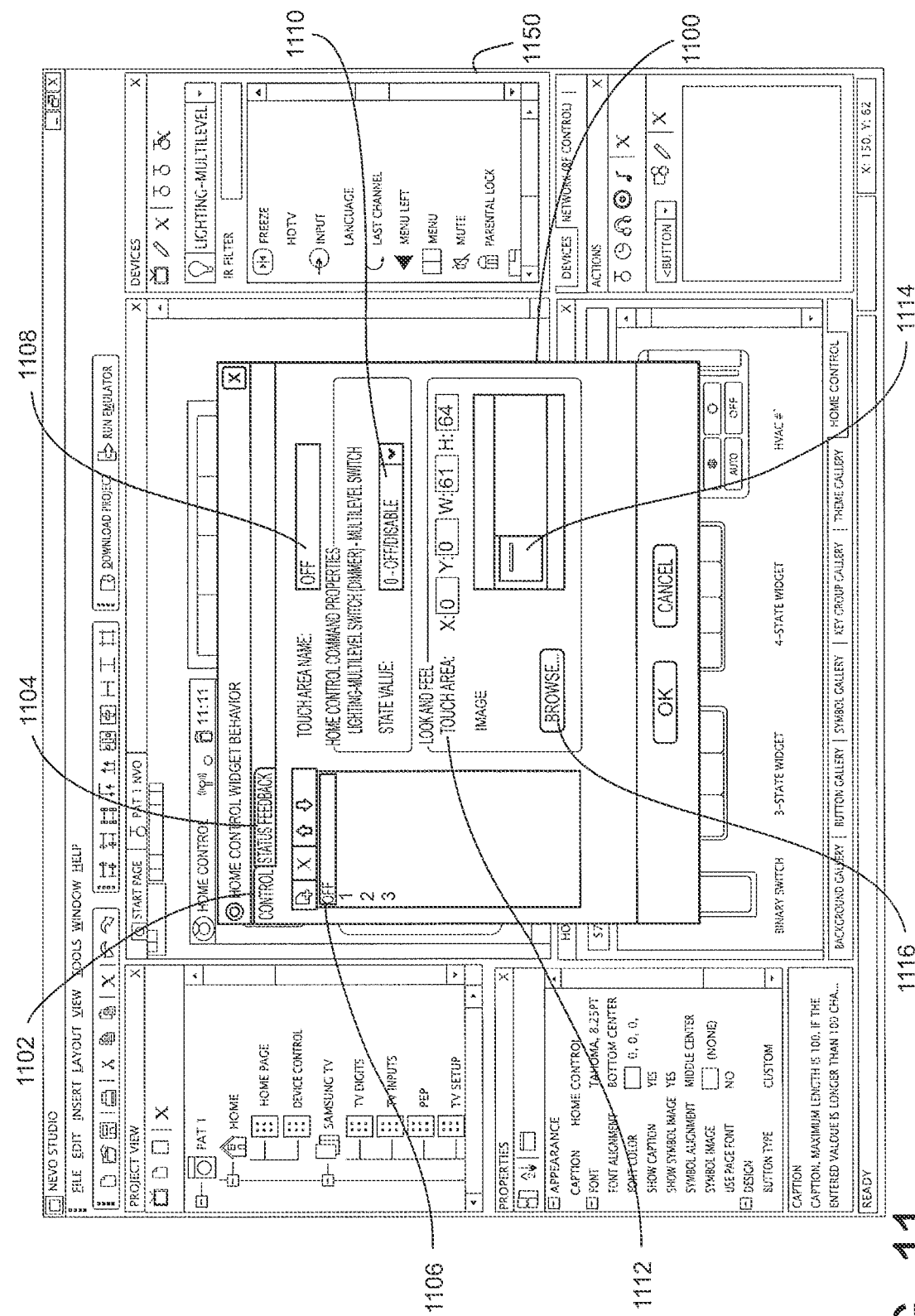
FIGS. 11, 12A, 12B, 13A, and 13B illustrate the PC-based configuration process of an exemplary multi-state widget.
Figure 12A:
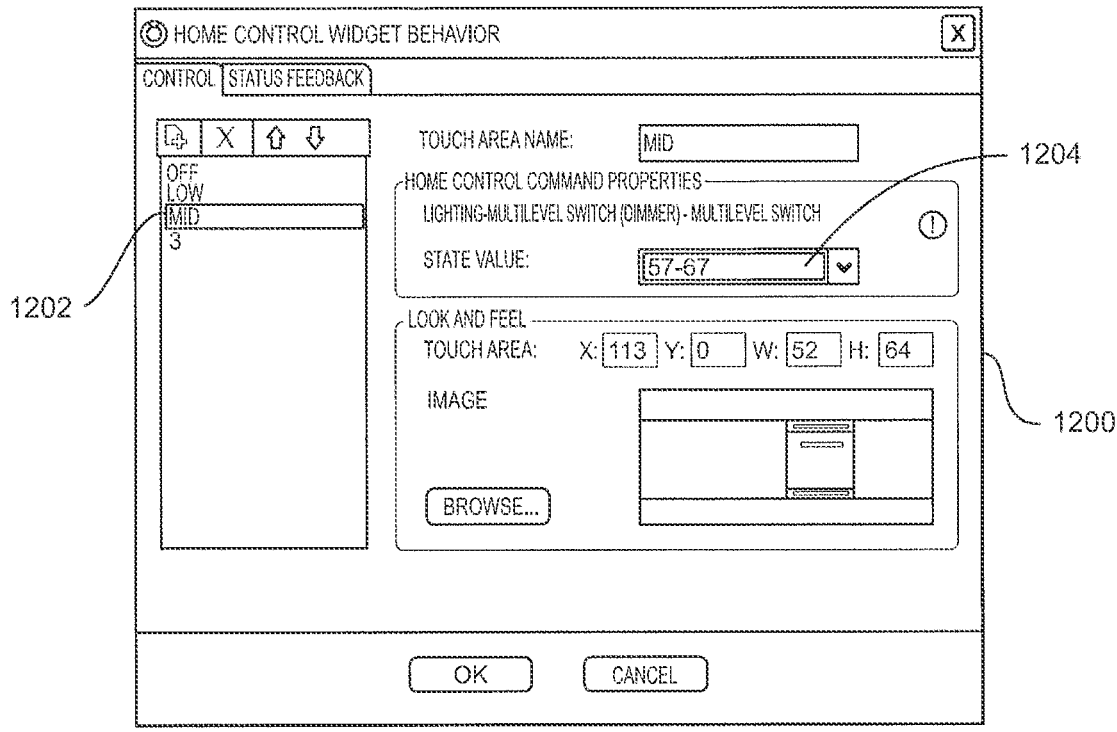
Figure 12B:
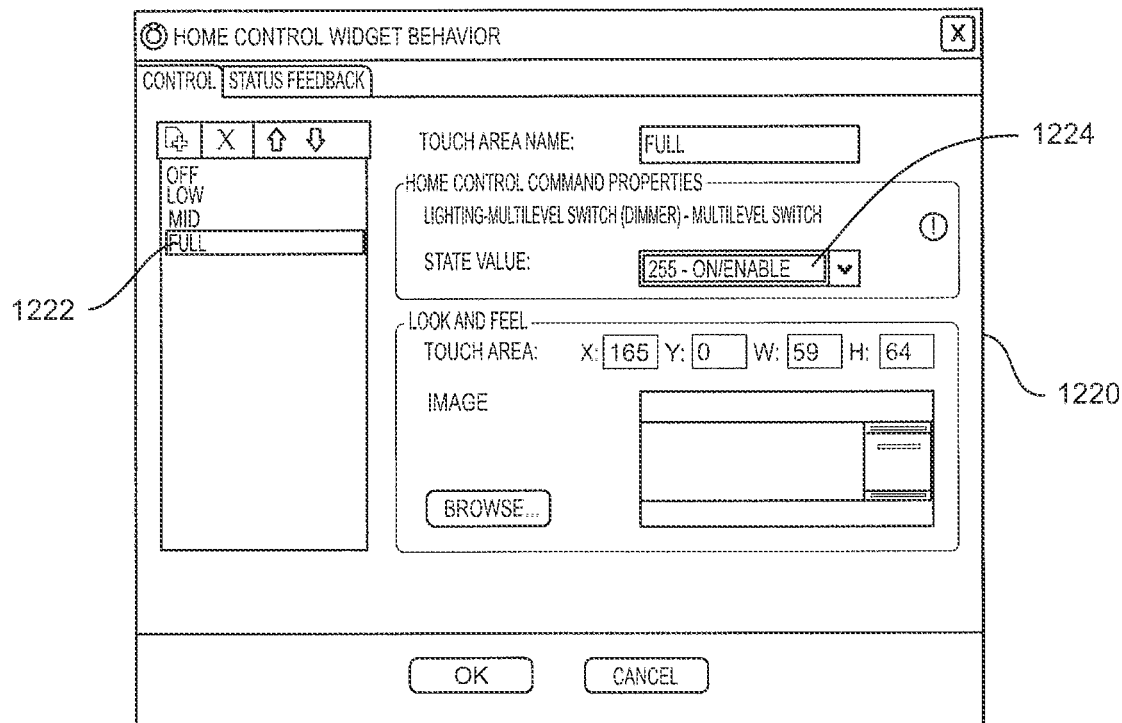

As mentioned earlier, an n-state widget, such as 4-state lighting control widget 1008, may comprise multiple touch areas, actions, images, and status responses all of which are independently variable. Once placed on a GUI page as described above, in an exemplary embodiment of editing program 300 double clicking image 1008 may initiate a widget configuration wizard 1100 superimposed on the standard PC screen display 1150 of editor application 300 as illustrated in FIG. 11. Such a wizard may include without limitation tabs 1102 and 1104 for configuration of control (widget outputs) and status feedback (widget input) functionalities respectively. When control tab 1102 is selected as illustrated in FIGS. 11 and 12, wizard display 1100 may include a listing 1106 of possible states, four in this specific example, from which the state currently under configuration may be selected, state one in this illustration. Configuration input areas may comprise a field 1008 into which may be entered a user-friendly descriptive name for the state; a drop-down menu 1110 for selection of a parameter value to be transmitted to the target appliance upon selection of this state, zero or "Off/Disable" in this instance, it being noted that this value may be a generic abstraction which may be converted to a real appliance command value at a later point when the widget is linked to a target appliance; a set of entries 1112 for defining the portion of the overall widget touch area which is to be associated with this state, expressed in an exemplary embodiment in terms of width and height, in pixels, and an X, Y starting coordinate relative to the top left corner of the overall widget area; and an image 1114 to be displayed upon activation of this touch area, which may be selected from a user library of images via a browse function 1116 as desired.

Turning now to FIG. 12, additional steps in configuring widget 1008 are illustrated (for clarity, background display 1150 has been omitted from all further illustrations of the widget configuration wizard). As illustrated at 1200, the third state 1202, labeled "Mid" is configured to transmit a parameter value of "67" upon activation of the relevant touch area, while as illustrated at 1220 the fourth state 1222 labeled "Full" is configured to transmit a parameter value of "255—On/Enable" upon activation of the relevant touch area.

Figure 13A:
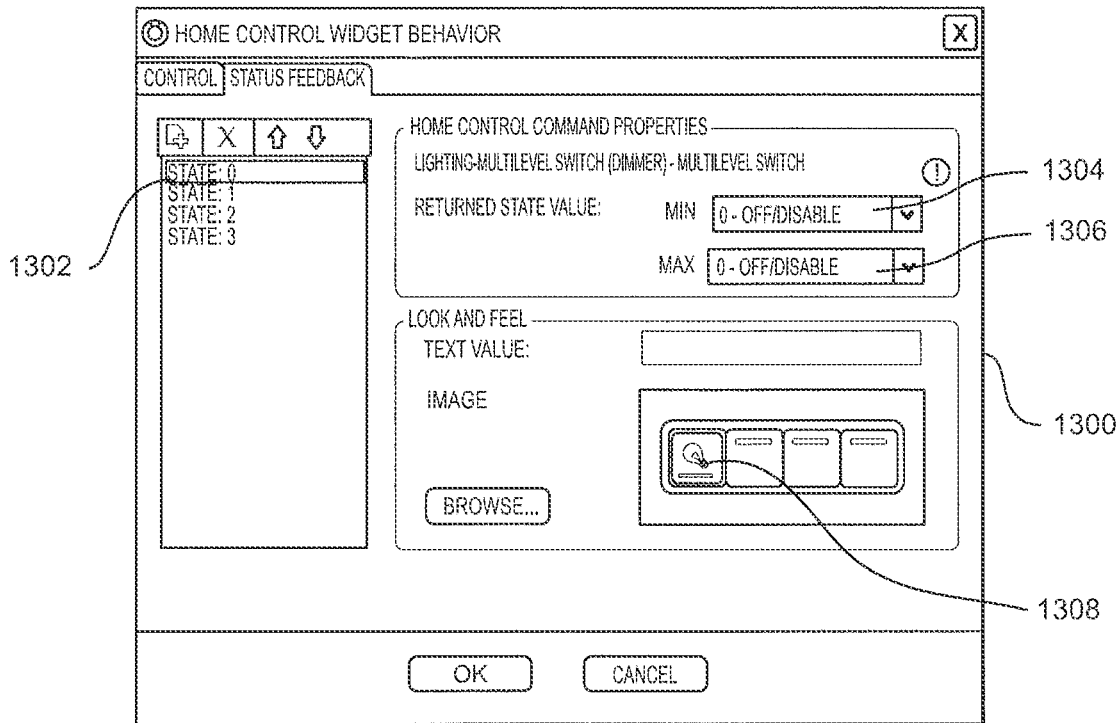
Figure 13B:
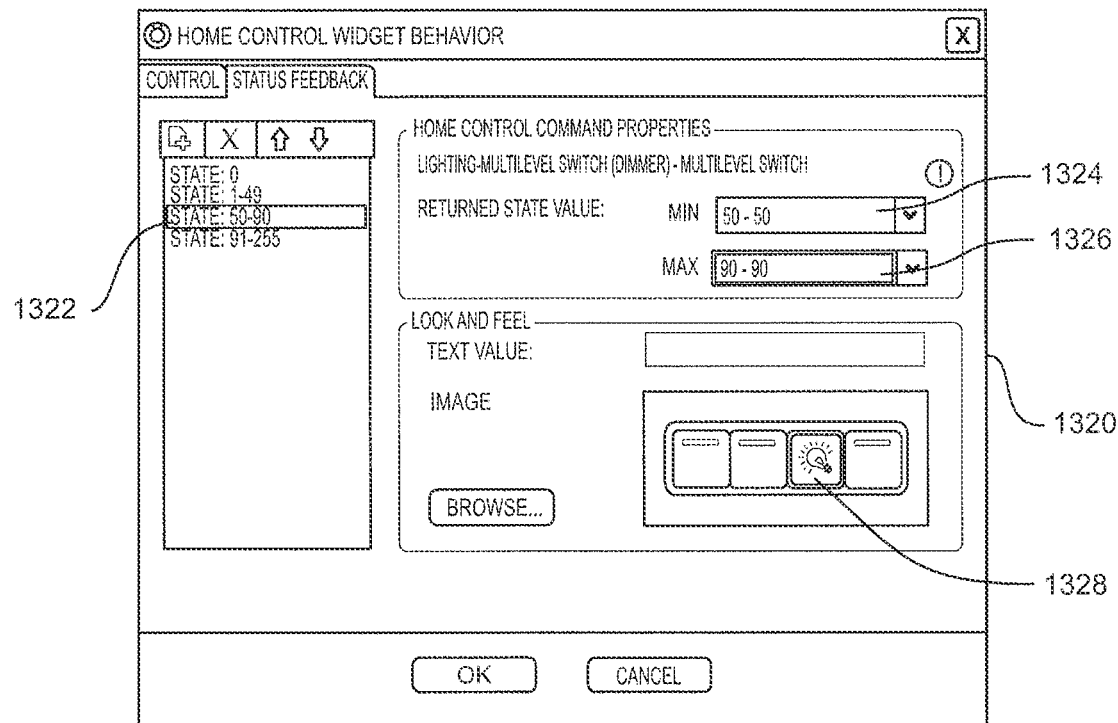

Turning now to FIG. 13, upon activation of the "Status Feedback" tab 1104 of exemplary widget configuration wizard 1100, an exemplary input screen 1300 may be displayed to permit configuration of the response of n-state widget 1008 to status feedback messages received from target appliances. As illustrated at 1300, the state zero response, selected at 1302, is invoked by an returned state value in the range bounded by the minimum/maximum values selected from drop down menus 1304 and 1306. In this illustrative example, it can be seen that the minimum/maximum values are identical, i.e., this response, being the icon display of image 1308, may only be invoked upon receipt of a returned status value of exactly zero, or off/disabled, from the target multilevel switch. As illustrated at 1320 however, it can be seen that the state three response selected at 1322 may be invoked by any returned status value in the range "50" through "90" to cause display 1328.

Figure 14A:
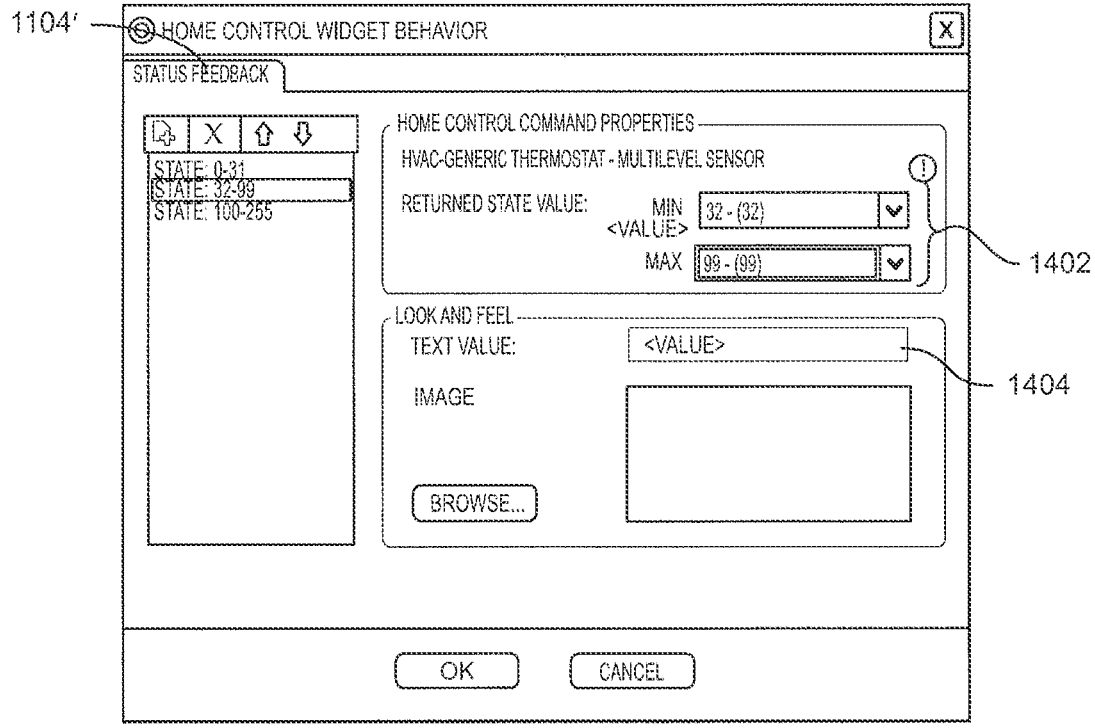
FIGS. 14A and 14B illustrate the PC-based configuration process of a second exemplary multi-state widget.
Figure 14B:
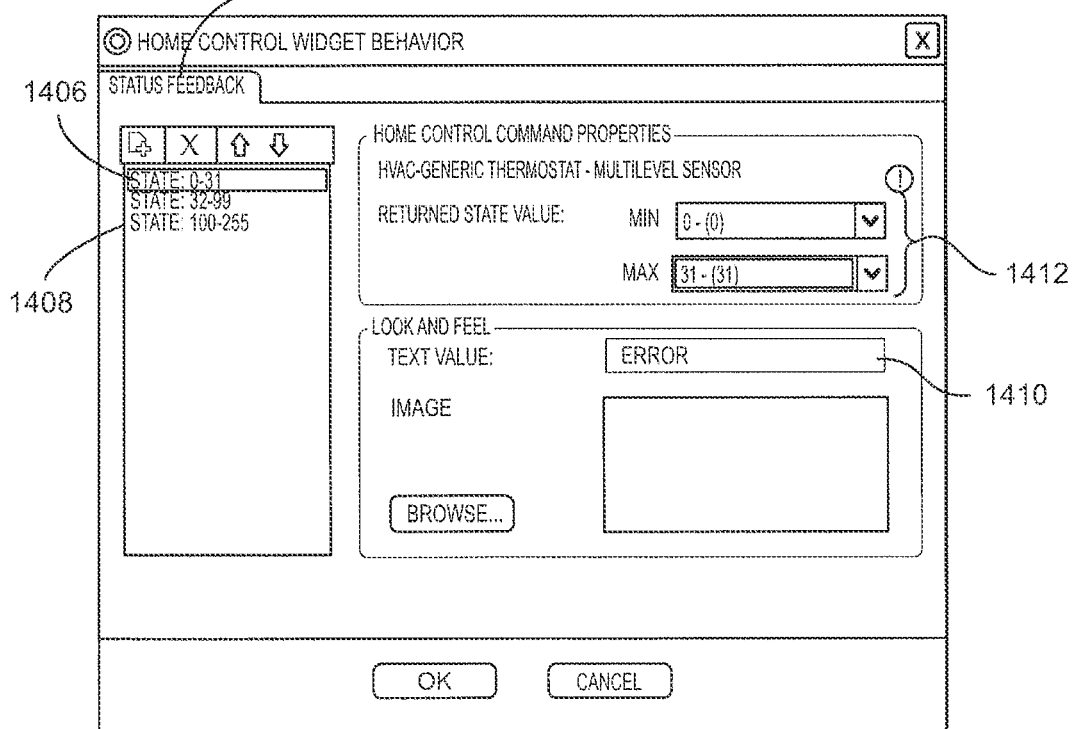

In some embodiments, certain n-state widgets may be defined which do not include all the attributes described in the previous example, i.e., image, touch control output, status input, and status response. By way of illustration, an exemplary current temperature display widget of a thermostat control, such as 1018 in FIG. 10, may include only status input and image response functionality. Definition of the behavior of such a widget may be as illustrated in FIG. 14, noting that the setup wizard display in this instance lacks a "control" setup tab such as seen at 1102, and presents only the "status" setup tab 1104' since no control functionality is associated with this exemplary widget. With reference to the setup wizard displays of FIG. 14, the behavior of the exemplary temperature display widget has been defined at field 1404 to display the actual numeric value returned by the thermostat appliance when this value is in the range of "32" to "99" as defined at 1402, and to display the text "Error" 1410 should the returned value be either higher 1408 or lower 1406 than these values, as illustrated 1412 in the case of the range of lower values. As will be appreciated, in order to maintain a current representation of the status value displayed, the implementation of such a widget in controlling device 100 may be required to poll the target appliance for an updated status from time to time. The configuration and operation of such a polling feature will be discussed in further detail hereafter.

Figure 15:
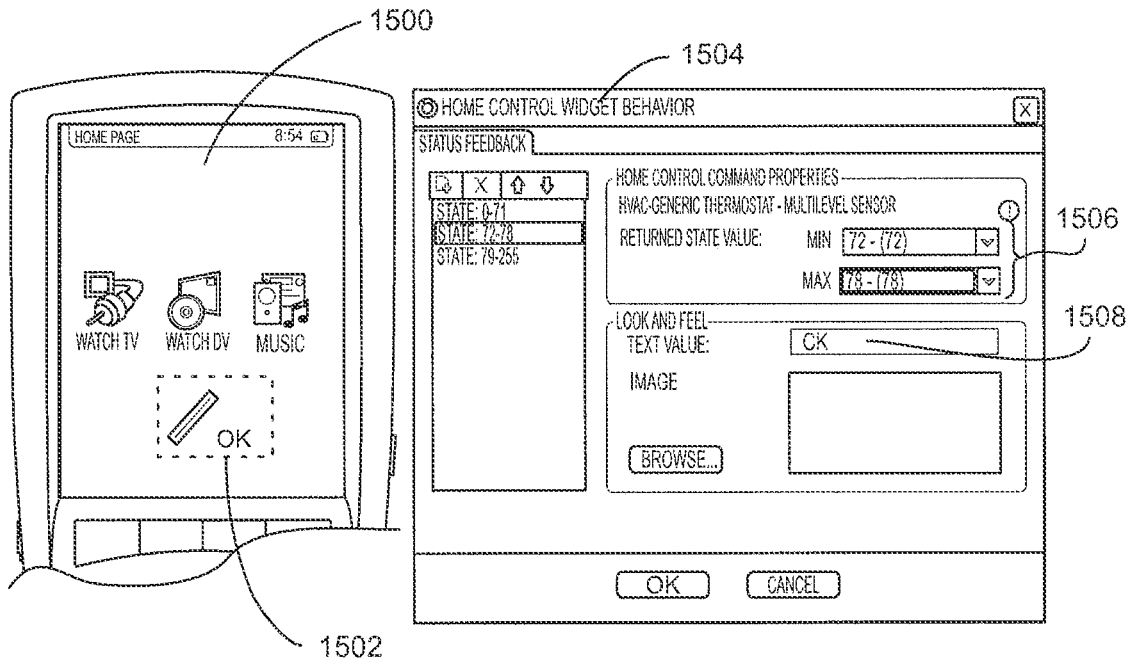
FIG. 15 illustrates the PC-based configuration process of a third exemplary multi-state widget.

Turning now to FIG. 15, by way of further illustration an exemplary second instance of a temperature display n-state widget 1502 may be placed on another page 1500 of the GUI page suite, associated with the same thermostat appliance, and defined 1504 in the same manner as described above, for example to serve as an informational display to permit a user of controlling device 100 to check current room temperature directly from an activities selection page 1500 as shown. In this example however, rather that a numerical value, the widget is defined to simply display "OK" if the reported temperature is in the range of "72" to "78" degrees.

Figure 16:
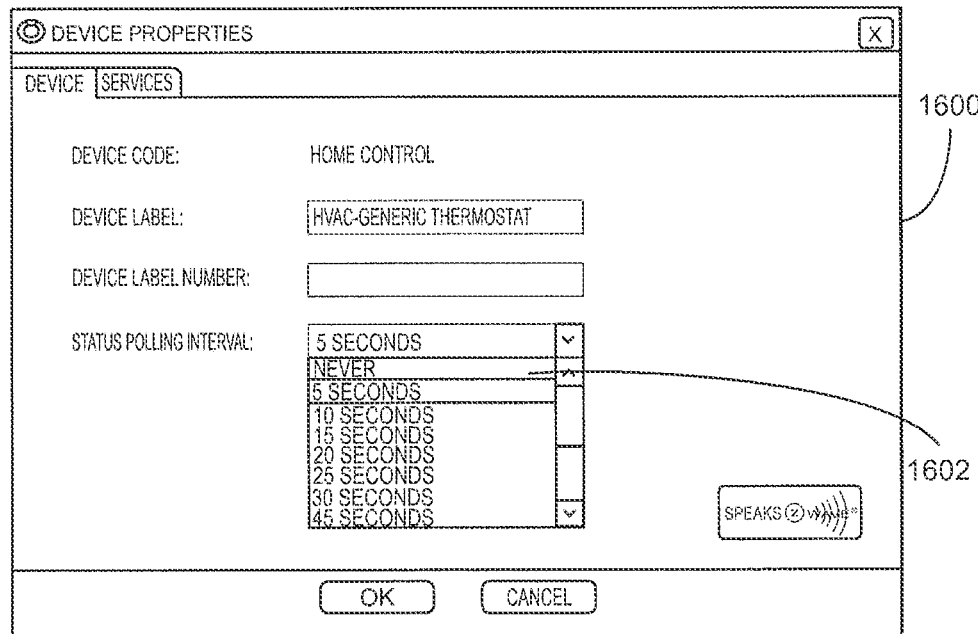
FIG. 16 illustrates the PC-based configuration of an exemplary repetitive polling process for obtaining appliance information to be used by the multi-state widgets illustrated in FIGS. 14 and 15.

As is apparent from the above, multiple n-state widgets may be defined to monitor and react to the same status of a target appliance. Accordingly, in some embodiments the required appliance polling functionality of controlling device 100 may be implemented as a single instance associated with the target appliance definition, and independent of the widgets which utilize the response data. In this manner a single polling sequence may retrieve the required status data on a periodic basis and cache the response value(s) for use as needed by particular widgets, e.g., when displayed, thereby minimizing overhead on the network or other communication link(s) used for appliance command and status messaging. In an exemplary embodiment, the polling parameters may thus be configured in GUI editor application 300 as a characteristic of the target appliance representation, and not as a characteristic of individual widgets. By way of example, clicking on an "edit device" icon 1016 in devices panel 912 may invoke an exemplary device properties configuration wizard 1600 for the current device, as illustrated in FIG. 16. Device configuration wizard 1600 may include a drop down menu 1602 from which an appropriate polling interval may be selected. As before, these parameters may be associated with a generic virtual device which is to be linked to an actual appliance only upon deployment of the GUI programming to a controlling device, for example controlling device 100.

When a user of exemplary editor program 300 has completed creation and/or modification of a GUI configuration, the GUI configuration may be subsequently transferred to a controlling device 100 either via a physical connection (e.g., a cable 304, a docking station, etc.) or via a wireless connection 306 (e.g., WiFi, Bluetooth, Z-wave, Zigbee, or any other suitable protocol), for example by clicking "Download project" tab 924. Prior to downloading, editor program 300 may pre-process certain elements of the project file 310 data into a data structure 311 which may be in a format more suitable for direct use within controlling device 100, as described in greater detail in previously referenced U.S. patent application Ser. No. 11/218,900.

Figure 17:
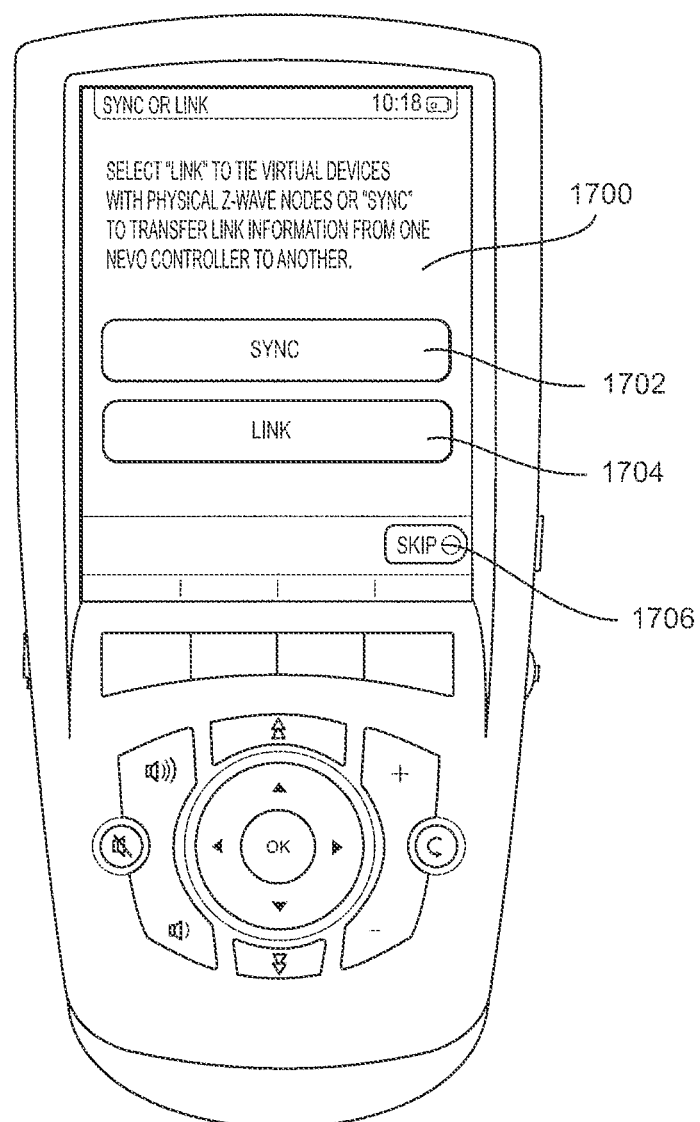
FIG. 17 illustrates an exemplary virtual device linkage initiation GUI page for the touch screen of a controlling device.

As mentioned earlier, in certain self-configuring networks such as for example a Z-wave wireless mesh network for home control and automation based on components available from Zensys Inc., final appliance network addresses, etc., may only be determinable by a controlling device at the time that the controlling device is physically introduced into the network. Accordingly, in some embodiments a GUI configuration downloaded into an exemplary controlling device 100 may include generic virtual devices created as placeholders during the editing process. Turning now to FIG. 17, upon introduction of such an exemplary controlling device 100 into the network ecosystem in which it is to operate an initialization screen 1700 may be accessed to allow establishment of linkage(s) between virtual devices configured in the GUI programming of controlling device 100 and the physical network nodes which correspond to target controlled appliances in the ecosystem. In an exemplary embodiment, a user of controlling device 100 may be presented with touch icons 1704 activatable to initiate a link management wizard, 1702 activatable to initiate transfer of preexisting link assignments from another controlling device already present in the ecosystem, and 1706 to defer establishment of linkages to later time. As will be appreciated, if this latter alternative 1706 is selected any currently unlinked virtual devices will be non-functional until such future time as linkage is completed. Such non-operational status may be represented in the GUI pages of controlling device 100 by grayed-out or otherwise altered icons, error messages on entry to those pages or upon icon actuation, visible or audible warning upon icon actuation, etc., or any combination thereof as appropriate for a particular embodiment.

Figure 18A:
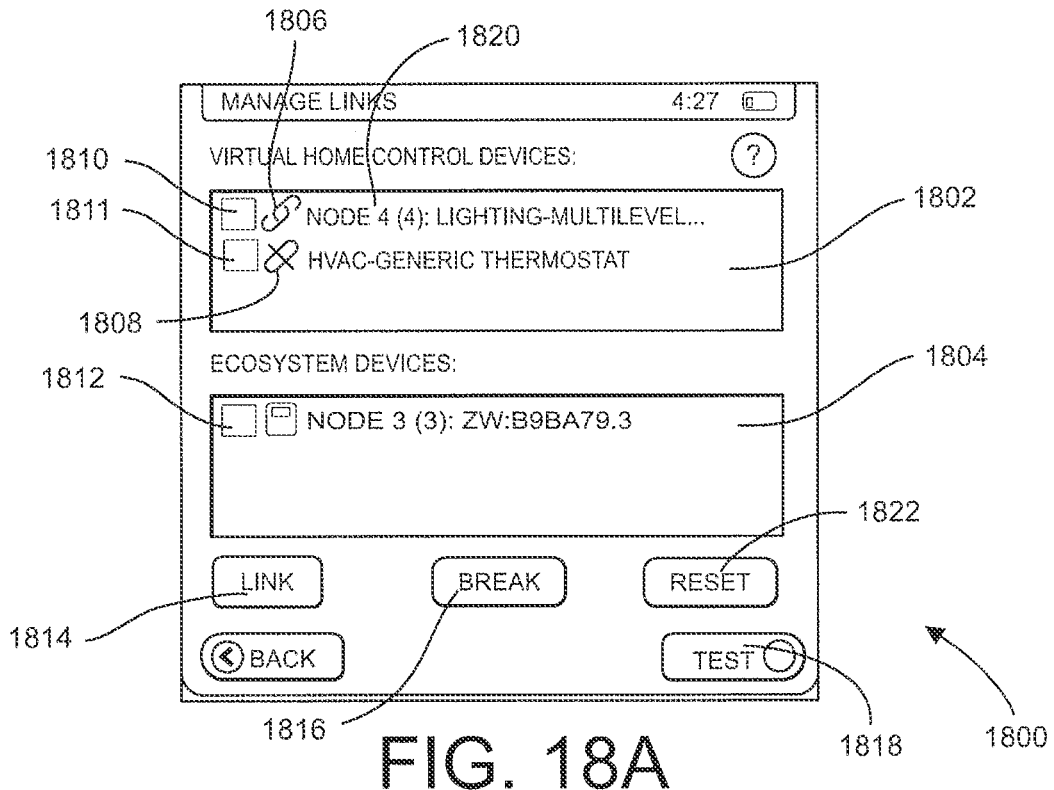
FIGS. 18A and 18B illustrate an exemplary virtual device linkage definition and test GUI pages for the touch screen of a controlling device.
Figure 18B:
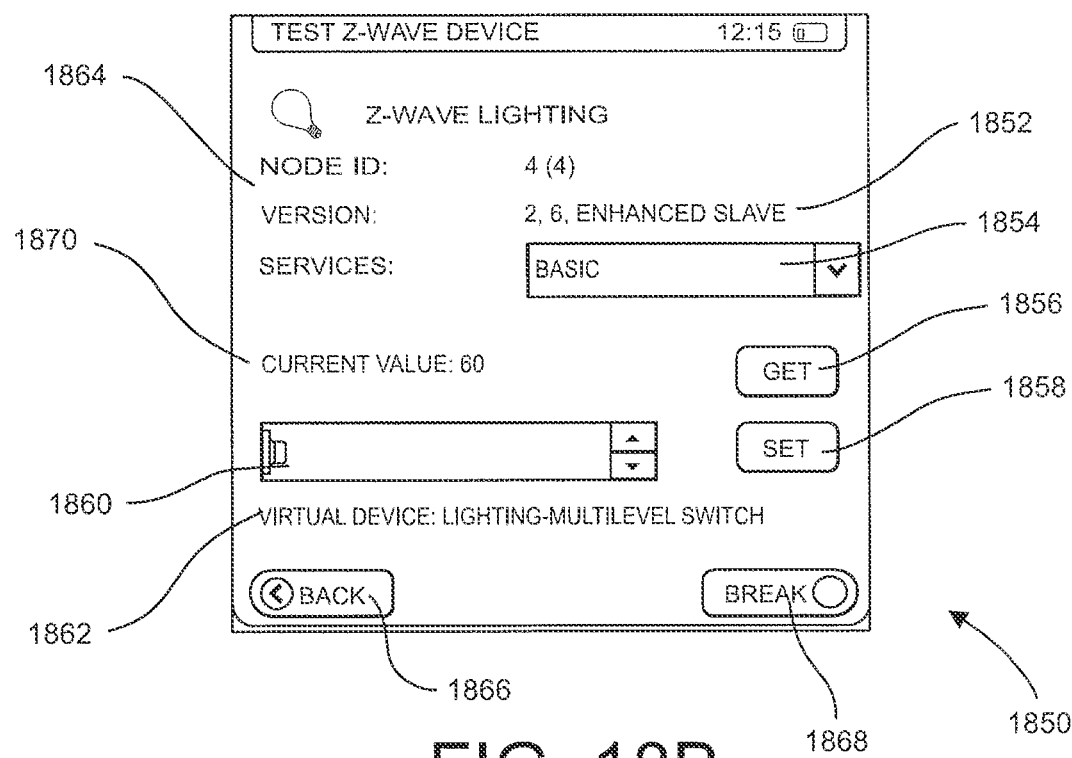
Figure 19A:
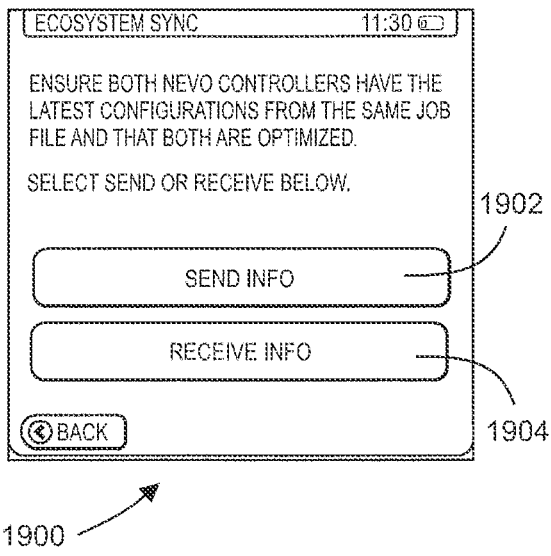
FIGS. 19A, 19B, 19C, and 19D illustrate exemplary touch screen GUI pages for the synchronization of the link tables of a pair of controlling devices.
Figure 19B:
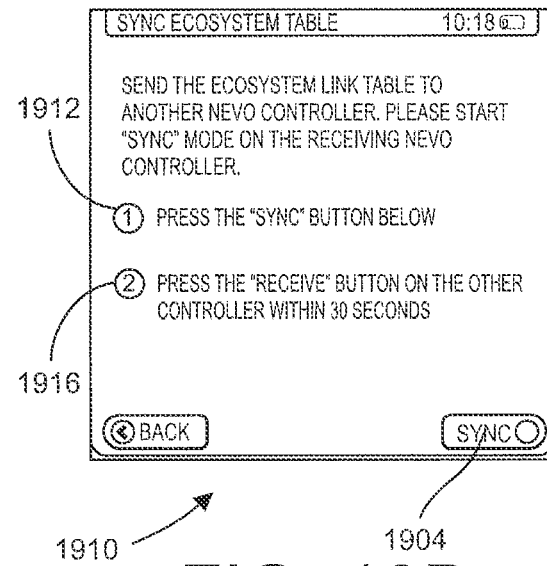
Figure 19C:
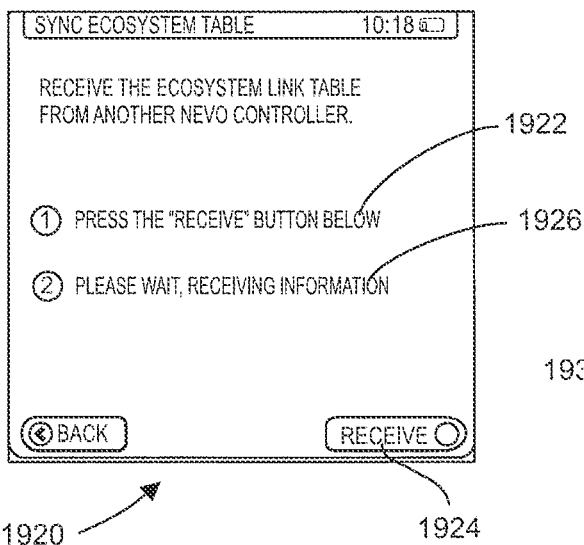
Figure 19D:
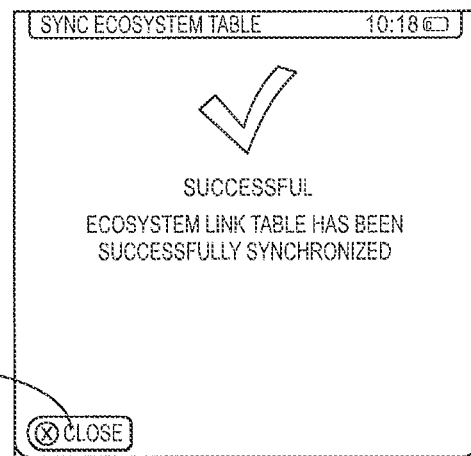

Upon activation of "Link" icon 1704, in an exemplary embodiment a user may be presented with a display 1800 as illustrated in FIG. 18. (For brevity, only the screen contents and not the full outline of controlling device 100 are presented in this and subsequent illustrations.) Such a display may comprise an area 1802 in which may be presented a list of virtual devices present in the GUI configuration of controlling device 100 together with their current linked/unlinked status, together with an area 1804 in which may be presented a list of unlinked physical nodes present in the current ecosystem. The list of virtual devices presented in area 1802 may include indications 1806,1808 representative of the current linked (1806) or unlinked (1808) status of each virtual device, together with an indication 1820 of the associated physical appliance node for those virtual devices which are linked. In the example illustrated, it can thus be seen that the multilevel lighting virtual device, corresponding for example to GUI icon 1008 of FIG. 10, has been linked to physical node "4" of the current Z-wave ecosystem. Checkboxes 1810, 1811 and 1812 may be provided for user selection of individual items listed in the two areas. In order to link a virtual device to physical node, a user may touch one checkbox in each of the respective lists, for example 1811 and 1812, followed by actuation of the "Link" icon 1814.

Alternatively, to cancel an existing linkage a user may touch the checkbox associated with an already configured virtual device, for example checkbox 1810 corresponding to the link 1806, followed by actuation of the "Break" icon 1816. In confirmation of such an action, the linkage indicator 1806 may be changed to an "unlinked" symbol similar to that illustrated at 1808 and an entry corresponding to the newly-detached physical node "4" added to the list of available ecosystem nodes displayed in area 1804. In some embodiments, a "Reset" icon 1822 may also be provided, actuation of which may break all existing links—to be used, for example, when relocating a controlling device to an entirely new environment.

Before a link between a virtual equivalent of an appliance and an intended target appliance is finalized for use within an operational configuration of the controlling device 100, a user may be afforded an opportunity to ascertain if controlling device 100 is communicating with an intended target appliance or an appropriate appliance node either before or after a virtual device to physical node linkage is established. In an exemplary embodiment this may be achieved by selection of either an already-linked virtual device from the list in area 1802 (e.g., Multilevel Lighting node 1810) or selection of one unlinked item from each of areas 1802 and 1804 (e.g., Generic Thermostat 1811 and Z-wave ecosystem node "3" 1812), followed by actuation of "Test" icon 1818. In the embodiment illustrated, this may result in display of a page 1850 which lists the features and status of the selected appliance (node "4", Multilevel Lighting, in the illustrated case.) From this display, a user may ascertain the node ID 1864 and associated (or to be associated) virtual device 1862, the type(s) of service 1854 available from this appliance node, and the current status of the appliance node 1870. Further, the user may exercise the appliance by selecting a parameter value from drop-down table 1860 and actuating the "Set" icon 1858 to cause transmission of that value to the appliance node. Subsequently, the changed status of the appliance may be verified by actuation of the "Get" icon 1856 which may cause the status display 1870 to be updated by retrieval of a new value from the appliance node. By way of specific example, if multilevel lighting node "4" corresponded to dimmer outlet 114 of FIG. 1, then upon entry into the test the illustrated displayed status 1870 would indicate that lamp 110 was currently set to 60% of maximum brightness. If the illustrated parameter 1860 ("0") were then to be transmitted to dimmer outlet 114 by actuation of the "Set" icon 1858, lamp 110 should be observed to turn off and upon subsequent actuation of the "Get" icon 1856, reported status 1870 should be observed to change to "0/Off".

In the event that appliance services or responses are not as expected or desired, if an already-linked virtual device/appliance node pair was under test, the link may be immediately broken by actuation of "Break" icon 1868. After completion of all desired testing, controlling device 100 may be returned to its previous state (i.e., screen 1800) by actuation of "Back" icon 1868.

In the event that a similar or compatible controlling device has already been configured with a set of virtual device to physical device linkages appropriate for the current ecosystem, upon introducing an additional controlling device 100 into the environment a user may select the "synchronize" option 1702, which mode may be used to transfer a copy of the exiting linkage assignments from the previously configured other controlling device to the newly-introduced controlling device. In order to accomplish this, both controlling devices may placed into the linkage initialization mode illustrated in FIG. 17, for example from a "settings" menu on the home pages of each, and the "Sync" icon 1702 actuated on both. With reference to FIG. 19, both controlling devices may then display an introductory screen 1900 comprising icons 1902, 1904 activatable to place one of the controlling devices into a mode for sending linkage data and the other controlling device into a mode for receiving linkage data. Upon actuation of the respective icons on the respective controlling devices, the controlling device placed into a send mode may display screen 1910 while the controlling device placed into receive mode may display screen 1920. With reference to display 1910, an exemplary sending controlling device may present a user prompt 1912 requesting initiation of the synchronization process by activating a "Sync" icon 1914. Upon such initiation of the synchronization process, the sending controlling device may display a message 1916 requesting that the user activate the receive mode on another controlling device, and may thereafter begin polling a wireless local network (e.g., WiFi, Z-wave, Bluetooth, etc.) for a receive ready response from a like controlling device. With reference to display 1920, an exemplary receiving controlling device may present a user prompt 1922 requesting initiation of reception by activating a "Receive" icon 1924. Upon entering into the receive mode, the exemplary controlling device may begin to monitor a wireless local network for an enquiry from a like controlling device seeking to transfer linkage data. Upon detection of such a signal, an affirmative response may be issued by the receiving controlling device, after which data transfer may begin. During the transfer process, the receiving controlling device may display a status message 1926 indicating to the user that the transfer is in progress. Upon successful completion of the transfer, both controlling devices may display a completion message as illustrated by screen 1930, together with an icon 1932 activatable to end the synchronization process and return each controlling device to its previous operational mode.

While various concepts have been described in detail, it will be appreciated by those skilled in the art that various modifications and alternatives to those concepts could be developed in light of the overall teachings of the disclosure. For example, while the embodiments presented above are described in the context of universal remote controls (i.e., controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e., display screens, signage devices, teleprompters, etc.) without departing from the spirit and scope of the present invention. Still further, it will be appreciated that the user interfaces described herein need not be limited to controlling devices but can be utilized in connection with any device having input elements wherein it is desired to convey information concerning such input elements. For example, the user interface may be utilized with devices such as calculators, phones, appliances, etc. having input elements having associated information conveying images in the form of alphanumeric and/or symbolic labels. It will also be understood that modification, editing, or updating of configuration settings may be performed either by a user or though any automated computing processes as are well known in the art. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A method for configuring a controlling device to command functional operations of an intended target appliance, comprising:
   receiving into the controlling device data that functions to identify the intended target appliance;
   causing the controlling device to use the received data that functions to identify the intended target appliance to establish within the controlling device a link functional operations of a virtual equivalent of the intended target appliance and command codes transmittable to the intended target appliance to control corresponding functional operations of the intended target appliance, wherein the command codes are caused to be transmitted to the intended target appliance in response to corresponding user interface elements of a graphical user interface provided to the controlling device being activated;
   causing the controlling device to periodically issue polling requests to the intended target appliance to thereby retrieve a state status of the intended target appliance; and
   caching one or more responses to the periodically issued polling requests in a memory of the controlling device to thereby allow the state status of the intended target appliance to be used by plural n-state widgets of the graphical user interface provided to the controlling device.

2. The method as recited in claim 1, wherein the data that functions to identify the intended target appliance is received directly from the intended target appliance.

3. The method as recited in claim 1, wherein the data that functions to identify the intended target appliance is received from a device on a network that includes the intended target appliance.

4. The method as recited in claim 1, wherein the data that functions to identify the intended target appliance is received from another controlling device that is configured to control functional operations of the intended target appliance.

5. The method as recited in claim 1, wherein each of the plural n-state widgets comprises a definition of multiple areas of a touch-screen display of the controlling device, one or more images to be displayed within the one or more of the multiple areas of the touch-screen display of the controlling device, and one or more actions to be taken by the controlling device in response to user interaction with the one or more of the multiple areas of the touch-screen display of the controlling device.

6. The method as recited in claim 1, wherein each of the plural n-state widgets comprises a definition of one or more reactions to be taken by the controlling device in response to the state status of the intended target appliance.

7. A non-transitory, computer-readable media having stored thereon instructions for configuring a controlling device to command functional operations of an intended target appliance, the instructions, when executed by the controlling device, causing the controlling device to perform steps comprising:
   receiving into the controlling device data that functions to identify the intended target appliance;
   causing the controlling device to use the received data that functions to identify the intended target appliance to establish within the controlling device a link functional operations of a virtual equivalent of the intended target appliance and command codes transmittable to the intended target appliance to control corresponding functional operations of the intended target appliance, wherein the command codes are caused to be transmitted to the intended target appliance in response to corresponding user interface elements of a graphical user interface provided to the controlling device being activated;
   causing the controlling device to periodically issue polling requests to the intended target appliance to thereby retrieve a state status of the intended target appliance; and
   caching one or more responses to the periodically issued polling requests in a memory of the controlling device to thereby allow the state status of the intended target appliance to be used by plural n-state widgets of the graphical user interface provided to the controlling device.

8. The non-transitory, computer-readable media as recited in claim 7, wherein the data that functions to identify the intended target appliance is received directly from the intended target appliance.

9. The non-transitory, computer-readable media as recited in claim 7, wherein the data that functions to identify the intended target appliance is received from a device on a network that includes the intended target appliance.

10. The non-transitory, computer-readable media as recited in claim 7, wherein the data that functions to identify the intended target appliance is received from another controlling device that is configured to control functional operations of the intended target appliance.

11. The non-transitory, computer-readable media as recited in claim 7, wherein each of the plural n-state widgets comprises a definition of multiple areas of a touch-screen display of the controlling device, one or more images to be displayed within the one or more of the multiple areas of the touch-screen display of the controlling device, and one or more actions to be taken by the controlling device in response to user interaction with the one or more of the multiple areas of the touch-screen display of the controlling device.

12. The non-transitory, computer-readable media as recited in claim 7, wherein each of the plural n-state widgets comprises a definition of one or more reactions to be taken by the controlling device in response to the state status of the intended target appliance.

\* \* \* \* \*